(12) United States Patent
Hirose et al.

(10) Patent No.: US 8,669,012 B2
(45) Date of Patent: Mar. 11, 2014

(54) ANODE AND BATTERY

(75) Inventors: Takakazu Hirose, Fukushima (JP);
Kenichi Kawase, Fukushima (JP);
Isamu Konishiike, Fukushima (JP);
Nozomu Morita, Fukuoka (JP);
Takayuki Fujii, Fukushima (JP)

(73) Assignee: Sony Corporation, Tokyo (JP)

( * ) Notice: Subject to any disclaimer, the term of this patent is extended or adjusted under 35 U.S.C. 154(b) by 1518 days.

(21) Appl. No.: 12/127,271

(22) Filed: May 27, 2008

(65) Prior Publication Data

US 2009/0035651 A1 Feb. 5, 2009

(30) Foreign Application Priority Data

Jul. 26, 2007 (JP) ................................. 2007-194516

(51) Int. Cl.
*H01M 6/14* (2006.01)
*H01M 4/36* (2006.01)
*H01M 4/02* (2006.01)

(52) U.S. Cl.
USPC ........... 429/302; 429/209; 429/405; 429/484; 429/523

(58) Field of Classification Search
None
See application file for complete search history.

(56) References Cited

U.S. PATENT DOCUMENTS

| | | | | |
|---|---|---|---|---|
| 5,225,296 | A * | 7/1993 | Ohsawa et al. | 429/213 |
| 5,830,600 | A * | 11/1998 | Narang et al. | 429/326 |
| 7,588,859 | B1 * | 9/2009 | Oh et al. | 429/188 |
| 7,794,881 | B1 * | 9/2010 | Fujimoto et al. | 429/231.95 |
| 2003/0170549 | A1 * | 9/2003 | Murai | 429/329 |
| 2003/0215711 | A1 * | 11/2003 | Aramata et al. | 429/218.1 |
| 2004/0219432 | A1 * | 11/2004 | Kojima et al. | 429/231.95 |
| 2005/0084756 | A1 * | 4/2005 | Marple | 429/221 |
| 2005/0282071 | A1 * | 12/2005 | Tsuda et al. | 429/331 |
| 2006/0008706 | A1 * | 1/2006 | Yamaguchi et al. | 429/313 |
| 2006/0134521 | A1 * | 6/2006 | Shima | 429/231.1 |
| 2006/0222944 | A1 * | 10/2006 | Yamamoto et al. | 429/218.1 |
| 2007/0009801 | A1 * | 1/2007 | Inagaki et al. | 429/231.95 |

(Continued)

FOREIGN PATENT DOCUMENTS

JP 2007-18882 1/2007
JP 2008-243729 10/2008

OTHER PUBLICATIONS

Japanese Office Action issued Aug. 30, 2012, in Japan Patent Application No. 2007-194516.

(Continued)

*Primary Examiner* — David M Brunsman
*Assistant Examiner* — Sheng H Davis
(74) *Attorney, Agent, or Firm* — Oblon, Spivak, McClelland, Maier & Neustadt, L.L.P.

(57) ABSTRACT

A battery capable of improving cycle characteristics is provided. An anode includes: an anode active material layer including an anode active material on an anode current collector, the anode active material including silicon (Si) and having a plurality of pores, in which after electrode reaction, the volumetric capacity of a pore group with a diameter ranging from 3 nm to 200 nm both inclusive per unit weight of silicon is 0.3 cm$^3$/g or less, and the rate of change in the amount of mercury intruded into the plurality of pores is distributed so as to have a peak in a diameter range from 200 nm to 15000 nm both inclusive, the rate of change in the amount of mercury intruded being measured by mercury porosimetry.

52 Claims, 20 Drawing Sheets

(56) References Cited

U.S. PATENT DOCUMENTS

| | | |
|---|---|---|
| 2007/0111102 A1* | 5/2007 | Inoue et al. .................... 429/232 |
| 2007/0122701 A1* | 5/2007 | Yamaguchi ................ 429/218.1 |
| 2007/0180688 A1* | 8/2007 | Kawakami et al. .......... 29/623.1 |
| 2008/0020281 A1* | 1/2008 | Kogetsu et al. ............ 429/231.5 |
| 2008/0145757 A1* | 6/2008 | Mah et al. ..................... 429/219 |
| 2009/0269667 A1* | 10/2009 | Antonietti et al. ......... 429/231.4 |

OTHER PUBLICATIONS

Office Action issued Nov. 13, 2012 in Japanese Patent Application No. 2007-194516.

* cited by examiner

ANODE AND BATTERY

CROSS REFERENCES TO RELATED APPLICATIONS

The present invention contains subject matter related to Japanese Patent Application JP 2007-194516 filed in the Japanese Patent Office on Jul. 26, 2007, the entire contents of which being incorporated herein by reference.

BACKGROUND OF THE INVENTION

1. Field of the Invention

The present invention relates to an anode including an anode active material layer on an anode current collector, and a battery including the anode.

2. Description of the Related Art

In recent years, portable electronic devices such as camera-integrated VTRs (videotape recorders), cellular phones, or laptop computers are widely used, and size and weight reduction in the portable electronic devices and an increase in longevity of the portable electronic devices have been strongly demanded. Accordingly, as power sources for the portable electronic devices, the development of batteries, specifically lightweight secondary batteries capable of obtaining a high energy density have been promoted. Among them, a secondary battery (a so-called lithium-ion secondary battery) using insertion and extraction of lithium for charge-discharge reaction holds great promise, because the secondary battery is capable of obtaining a larger energy density, compared to a lead-acid battery or a nickel-cadmium battery.

The lithium-ion secondary battery includes a cathode, an anode and an electrolytic solution, and the anode includes an anode active material layer on an anode current collector. As an active material (anode active material) of the anode, a carbon material is widely used; however, recently with enhancement of performance and expansion of functions in portable electronic devices, a further improvement in battery capacity is desired, so it is considered to use silicon instead of a carbon material. It is because the theoretical capacity of silicon (4199 mAh/g) is much larger than the theoretical capacity of graphite (372 mAh/g), so an increase in battery capacity is expected.

In the case where silicon with high theoretical capacity is used as an anode active material, some attempts have been made. More specifically, a technique in which a conductive metal is reductively deposited on silicon particles (for example, refer to Japanese Unexamined Patent Application Publication No. H11-297311), a technique in which a silicon compound is coated with a metal (for example, refer to Japanese Unexamined Patent Application Publication No. 2000-036323), a technique in which a metal element not alloyed with lithium is dispersed in silicon particles (for example, refer to Japanese Unexamined Patent Application Publication No. 2001-273892), a technique in which copper is dissolved into a silicon thin film (for example, refer to Japanese Unexamined Patent Application Publication No. 2002-289177) or the like has been proposed.

As a method of forming the anode active material, a vapor-phase method such as a sputtering method is used (for example, refer to Japanese Unexamined Patent Application Publication Nos. 2005-285651, 2006-278104 and 2006-086058). More specifically, silicon is deposited on an anode current collector having a rough surface configuration, thereby an anode active material is formed so that the anode active material includes a plurality of columnar sections separated by gaps in a thickness direction, and each columnar section is in close contact with an anode current collector.

However, when silicon as an anode active material is deposited by a vapor-phase method, a plurality of pores (holes) are formed in the anode active material to increase the surface area of the anode active material, and the anode active material into which lithium is inserted during charge has high activity, so an electrolytic solution is easily decomposed, and lithium is easily inactivated. Thereby, while the secondary battery obtains a higher capacity, cycle characteristics which are important characteristics of the secondary battery easily decline. In particular, the presence of pores with a small diameter has a large influence on the surface area of the anode active material, so the presence of the pores is a major cause of a decline in cycle characteristics.

Some cases about the formation of a plurality of pores in the anode active material have been reported (for example, refer to Japanese Unexamined Patent Application Publication Nos. 2005-293899 and 2004-071305). In this case, the case where during initial charge and discharge, a plurality of primary particles are aggregated to form a plurality of secondary particles, and the secondary particles are separated by grooves in a thickness direction, and some of the primary particles are split by the grooves to form split particles has been reported (for example, refer to Japanese Unexamined Patent Application Publication No. 2006-155957).

Like the above-described pores with a small diameter, the widths of grooves separating secondary particles have a large influence on cycle characteristics. More specifically, when a large number of grooves with a narrow width which separate secondary particles per unit area are formed, the size and the surface area of one secondary particle are reduced; however, the surface area of the whole anode active material made of secondary particles is increased, so an electrolytic solution is easily decomposed. On the other hand, when grooves with a wide width which separate secondary particles are formed, secondary particles are less likely to be split into small pieces, so the surface area of the anode active material per unit area is reduced, so the electrolytic solution is less likely to be decomposed, but the size of one secondary particle is increased, so a stress according to swelling and shrinkage of the anode active material during charge and discharge is increased. Thereby, it is difficult to release a stress in the anode active material layer, so an anode active material layer is easily peeled from an anode current collector.

SUMMARY OF THE INVENTION

As recent portable electronic devices have a smaller size, higher performance and more functions, secondary batteries tend to be frequently charged and discharged accordingly, thereby cycle characteristics easily decline. Therefore, further improvement in cycle characteristics of the secondary battery is desired.

In view of the foregoing, it is desirable to provide an anode and a battery which are capable of improving cycle characteristics.

According to an embodiment of the invention, there is provided an anode including: an anode active material layer including an anode active material on an anode current collector, the anode active material including silicon and having a plurality of pores, in which after electrode reaction, the volumetric capacity of a pore group with a diameter ranging from 3 nm to 200 nm both inclusive per unit weight of silicon is 0.3 cm$^3$/g or less, and the rate of change in the amount of mercury intruded into the plurality of pores is distributed so as to have a peak in a diameter range from 200 nm to 15000 nm both inclusive, the rate of change in the amount of mercury intruded being measured by mercury porosimetry.

According to an embodiment of the invention, there is provided a battery including a cathode, an anode and an electrolytic solution, in which the anode includes: an anode active material layer including an anode active material on an anode current collector, the anode active material including silicon and having a plurality of pores, and after charge and discharge, the volumetric capacity of a pore group with a diameter ranging from 3 nm to 200 nm both inclusive per unit weight of silicon is 0.3 $cm^3/g$ or less, and the rate of change in the amount of mercury intruded into the plurality of pores is distributed so as to have a peak in a diameter range from 200 nm to 15000 nm both inclusive, the rate of change in the amount of mercury intruded being measured by mercury porosimetry.

The above-described "volumetric capacity of a pore group" is determined by replacing the amount of mercury intruded which is measured by mercury porosimetry using a mercury porosimeter with the volumetric capacity of the pore group. Thereby, "the capacity of a pore group with a diameter ranging from 3 nm to 200 nm both inclusive" is determined by replacing the measured total amount of mercury intruded into pores with a diameter ranging from 3 nm to 200 nm both inclusive with the volumetric capacity of the pore group, and "the volumetric capacity ($cm^3/g$) of a pore group with a diameter ranging from 3 nm to 200 nm both inclusive per unit weight of silicon" is calculated from the weight (g) of silicon and the amount of mercury intruded (=the capacity of a pore group with a diameter ranging from 3 nm to 200 nm both inclusive: $cm^3$). Moreover, the above-described "amount of mercury intruded being measured by mercury porosimetry" means the amount of mercury intruded into a plurality of pores which is measured by a mercury porosimeter. Thereby, "the rate of change in the amount of mercury intruded is distributed so as to have a peak in a diameter range from 200 nm to 15000 nm both inclusive" means that in the measurement result of the mercury porosimeter (the horizontal axis: diameter, the vertical axis: the rate of change in the amount of mercury intruded), the rate of change in the amount of mercury intruded is distributed so as to draw an upward convex curve (a so-called peak) in a diameter range from 200 nm to 15000 nm both inclusive. In addition, the above-described amount of mercury intruded is a value measured under conditions that the surface tension and the contact angle of mercury are 485 mN/m and 130°, respectively, and a relationship between the diameter of a pore and pressure is approximate to 180/pressure=diameter.

In the anode according to the embodiment of the invention, in the case where the anode active material including silicon has a plurality of pores, after electrode reaction, the volumetric capacity of a pore group with a diameter ranging from 3 nm to 200 nm both inclusive per unit weight of silicon is 0.3 $cm^3/g$ or less, and the rate of change in the amount of mercury intruded into the plurality of pores which is measured by mercury porosimetry is distributed so as to have a peak in a diameter range from 200 nm to 15000 nm both inclusive. In this case, even in the case where during electrode reaction, the anode active material has high activity, and is easily swelled and shrunk, the anode active material is less prone to reacting with another material, and the anode active material layer is less prone to being peeled from the anode current collector. Thereby, in the battery including the anode according to the embodiment of the invention, the cycle characteristics may be improved. In particular, when the volumetric capacity of the pore group per unit weight of silicon and the diameter at which the rate of change in the amount of mercury intruded has a peak are within a range of 0.1 $cm^3/g$ or less, and a range from 700 nm to 12000 nm both inclusive, respectively, more specifically 0 $cm^3/g$ and within a range from 1000 nm to 10000 nm both inclusive, respectively, the cycle characteristics may be further improved.

Other and further objects, features and advantages of the invention will appear more fully from the following description.

DETAILED DESCRIPTION OF THE PREFERRED EMBODIMENTS

A preferred embodiment will be described in detail below referring to the accompanying drawings.

Figure 1:
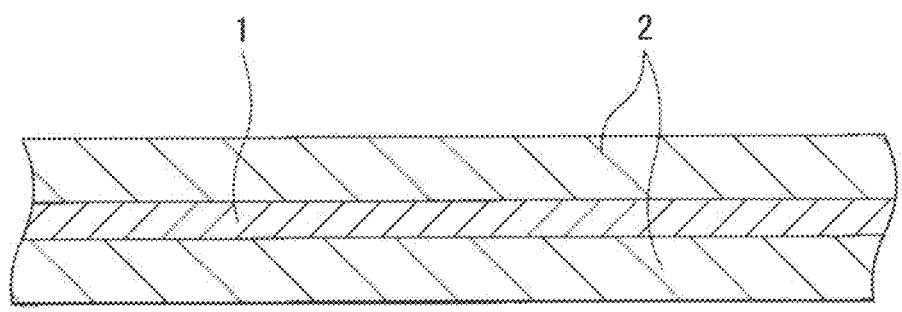
FIG. 1 is a sectional view showing the configuration of an anode according to an embodiment of the invention.

FIG. 1 shows a sectional view of an anode according to an embodiment of the invention. The anode is used in, for example, an electrochemical device such as a battery, and includes an anode current collector 1 having a pair of facing surfaces, and an anode active material layer 2 arranged on the anode current collector 1. The anode active material layer 2 may be arranged on both sides or only one side of the anode current collector 1.

The anode current collector 1 is preferably made of a material having good electrochemical stability, electrical conductivity and mechanical strength. Examples of the material include metal materials such as copper, nickel, stainless and the like, and among them, copper is preferable, because high electrical conductivity is obtained.

In particular, as the material of which the anode current collector 1 is made, a material including one kind or two or more kinds of metal elements which do not form an intermetallic compound with an electrode reactant is preferable. When the metal elements form an intermetallic compound with the electrode reactant, the influence of a stress due to swelling and shrinkage of the anode active material layer 2 during the operation of an electrochemical device (for example, during charge and discharge of a battery) may cause a decline in the current collecting property or peeling of the anode active material layer 2 from the anode current collector 1. Examples of such metal elements include copper, nickel, titanium, iron, chromium and the like.

Moreover, the material of which the anode current collector 1 is made preferably includes one kind or two or more kinds of metal elements which are alloyed with the anode active material layer 2. It is because adhesion between the anode current collector 1 and the anode active material layer 2 is improved, so the anode active material layer 2 is less prone to being peeled from the anode current collector 1. Examples of metal elements which do not form an intermetallic compound with the electrode reactant and are alloyed with the anode active material layer 2 include copper, nickel, iron and the like in the case where the anode active material layer 2 includes silicon as an anode active material. These metal elements are preferable in terms of strength and electrical conductivity.

The anode current collector 1 may have a single-layer configuration or a multilayer configuration. In the case where the anode current collector 1 has a multilayer configuration, for example, it is preferable that a layer adjacent to the anode active material layer 2 is made of a metal material which is alloyed with the anode active material layer 2, and a layer not adjacent to the anode active material layer 2 is made of any other metal material.

The surface of the anode current collector 1 is preferably roughened. It is because adhesion between the anode current collector 1 and the anode active material layer 2 is improved by a so-called anchor effect. In this case, at least a surface facing the anode active material layer 2 of the anode current collector 1 may be roughened. As a roughening method, for example, a method of forming fine particles by electrolytic treatment or the like is cited. The electrolytic treatment is a method of forming fine particles on the surface of the anode current collector 1 in an electrolytic bath by an electrolytic method to form a roughened surface. Copper foil subjected to the electrolytic treatment is generally called "electrolytic copper foil".

The ten-point height of roughness profile Rz of the surface of the anode current collector 1 is preferably within a range from 1.5 μm to 6.5 μm both inclusive. It is because adhesion between the anode current collector 1 and the anode active material layer 2 is further improved. More specifically, when the ten-point height of roughness profile Rz is smaller than 1.5 μm, sufficient adhesion may not be obtained, and when the ten-point height of roughness profile Rz is larger than 6.5 μm, the anode active material may include a large number of holes to increase its surface area.

The anode active material layer 2 includes an anode active material capable of inserting and extracting an electrode reactant, and the anode active material includes silicon as an element. It is because silicon has a high capability of inserting and extracting an electrode reactant, so a high energy density is obtained. The anode active material includes a plurality of pores before and after electrode reaction, and the diameters of the pores are distributed over a wide range from approximately a few nm to a few tens of thousands nm.

When attention is given to pores with a small diameter ranging from 3 nm to 200 nm both inclusive (hereinafter simply referred to as "a small pore group"), the volumetric capacity of the small pore group per unit weight of silicon after electrode reaction is 0.3 $cm^3/g$ or less. It is because the volumetric capacity of the small pore group is reduced, thereby the surface area of the anode active material is controlled to be small, so even in the case where the anode active material has high activity during electrode reaction, the anode active material is less prone to reacting with another material. As another material, for example, an electrolytic solution in the case where the anode is used in a battery is cited.

In this case, the volumetric capacity of the small pore group per unit weight of silicon is preferably 0.1 $cm^3/g$ or less, and more preferably 0 $cm^3/g$, because a higher effect is obtained.

The volumetric capacity of the above-described small pore group per unit weight of silicon is determined by replacing the amount of mercury intruded which is measured by mercury porosimetry using a mercury porosimeter with the volumetric capacity of the small pore group. The amount of mercury intruded is a value measured under conditions that the surface tension and the contact angle of mercury are 485 mN/m and 1300, respectively, and a relationship between the diameter of a pore and pressure is approximate to 180/pressure=diameter. By the above-described mercury porosimetry, in the case where the diameters of the plurality of pores are distributed over a wide range, it is possible to measure the volumetric capacities of pores (the amount of mercury intruded into pores) in each specific diameter range, so it is possible to determine the above-described volumetric capacity ($cm^3/g$) of the small pore group per unit weight of silicon from the total weight (g) of silicon and the measured total amount of mercury intruded into pores with a diameter ranging from 3 nm to 200 nm both inclusive (the total volumetric capacity of the small pore group: $cm^3$). The reason why the pores with a diameter ranging from 3 nm to 200 nm both inclusive are used when defining the range of the volumetric capacity of the small pore group per unit weight of silicon is that as the volumetric capacity of each pore is small, but the total number of pores is extremely large, so the pores have a large influence on the surface area of the anode active material.

Moreover, when attention is given to pores with a large diameter of 200 nm or over, after electrode reaction, the rate of change in the amount of mercury into a plurality of pores which is measured by mercury porosimetry is distributed so as to have a peak in a diameter range from 200 nm to 15000 nm both inclusive. It is because the volumetric capacity of a pore with a large diameter is relatively larger than the volumetric capacity of a pore with a small diameter, so the surface area of the anode active material is reduced. Further, the width of a groove separating secondary particles which will be described later is appropriately increased after electrode reaction, so the areas of the secondary particles are appropriately increased. Thereby, even in the case where the anode active material has high activity during electrode reaction, and is swelled or shrunk, the anode active material is less prone to reacting with another material, and the anode active material layer 2 is less prone to being peeled from the anode current collector 1. The reason why the diameter range from 200 nm or over is used when defining a diameter at which the rate of change in the amount of mercury intruded has a peak is that as the volumetric capacities of pores with a diameter ranging from 200 nm or over do not largely contribute to the surface area of the anode active material, and the volumetric capacities of the pores are appropriate for a space (spatial margin) for the anode active material during swelling and shrinkage.

In this case, the rate of change in the amount of mercury intruded preferably has a peak in a diameter range from 700 nm to 12000 nm both inclusive, more specifically in a diameter range from 1000 nm to 10000 nm both inclusive, because a higher effect is obtained.

The above-described rate of change in the amount of mercury intruded is measurable by a mercury porosimeter, and from the measurement result of the mercury porosimeter, it may be determined whether or not the rate of change in the amount of mercury intruded has a peak in a diameter range from 200 nm to 15000 nm both inclusive. The measurement conditions of mercury porosimeter are the same as those in the case where the volumetric capacity of the small pore group per unit weight of silicon is described.

In the case where the rate of change in the amount of mercury intruded has a peak in a diameter range from 200 nm to 15000 nm both inclusive, the rate of change in the amount of mercury intruded may or may not have another peak in a diameter range of smaller than 200 nm or larger than 15000 nm. Moreover, the number of peaks in a diameter range from 200 nm to 15000 nm both inclusive may be one or plural (two or more). The same hold for the number of peaks in a diameter range smaller than 200 nm or larger than 15000 nm.

The anode active material layer 2 may include, if necessary, an imbedding material in pores so as to set the volumetric capacity of the small pore group per unit weight of silicon within the above-described range. Examples of the imbedding material include an oxide-containing film, a metal material not alloyed with an electrode reactant, a fluorine resin and the like. It is because when the oxide-containing film or the like is put in the pores, the volumetric capacity of the small pore group per unit weight of silicon is controllable to have a desired value.

The oxide-containing film includes, for example, at least one kind of oxide selected from the group consisting of an oxide of silicon, an oxide of germanium and an oxide of tin. The oxide-containing film may include an oxide of any other element except for them. The oxide-containing film may be formed by any method such as a vapor-phase method or a liquid-phase method. Among them, a liquid-phase method such as a liquid-phase deposition method, a sol-gel method, a coating method or an immersion method (a dip coating method) is preferable, and the liquid-phase deposition method is more preferable, because the oxide-containing film is easily intruded into the pores.

For example, the metal material not alloyed with an electrode reactant includes at least one kind selected from the group consisting of iron, cobalt, nickel, zinc and copper. The metal material may include any other metal element except for them. The form of the metal material is not limited to the simple substance, and the metal material may be an alloy or a metal compound. The metal material may be formed by any method such as a vapor-phase method or a liquid-phase method. Among them, the liquid-phase method such as a plating method (an electrolytic plating method or an electroless plating method) is preferable, and the electrolytic plating method is more preferable, because the metal material is easily intruded into the pores, and only a short plating time is necessary. In particular, when the anode active material layer 2 includes the above-described metal material in pores, the metal material also functions as a binder, so binding in the anode active material is improved.

The fluorine resin includes, for example, an ether bond. It is because the fluorine resin including an ether bond may form a film with high chemical stability. The "fluorine resin including an ether bond" means a generic name of a polymer compound having a configuration which includes a main chain formed of a linear carbon chain (and may or may not include a side chain), and including an ether bond in the configuration, and including a fluorine group as a substituent group. In this case, the ether bond may present in the main chain or the side chain, or both of them. The same holds for the fluorine group. In the case where the ether bond and the fluorine group are present in the main chain, the side chain may be removed.

As the fluorine resin, for example, at least one kind selected from the group consisting of polymer compounds represented by Chemical Formulas 1 to 6 is cited. It is because a film with high chemical stability may be formed. The polymer compounds represented by Chemical Formulas 1 to 4 are so-called perfluoropolyether, and include an ether bond in a main chain, and a fluorine group in the main chain, or the main chain and a side chain. The "perfluoropolyether" is a generic name of a resin having a configuration in which an ether bond and a divalent carbon fluoride group (for example, —$CF_2$—, >CF—$CF_3$ or the like) are bonded, and the numbers of ether bonds and carbon fluoride groups, the binding order of them, or the like is freely settable. The polymer compound represented by Chemical Formula 5 includes an ether bond in a main chain and a fluorine group in a side chain. The polymer compound represented by Chemical Formula 6 includes an ether bond in a side chain and fluorine groups in a main chain and the side chain. The ends of the compounds represented by Chemical Formulas 1 to 6 are freely settable; however, a monovalent carbon fluoride group (for example, —$CF_3$ or the like) is preferably located at the ends of the compounds. Among them, as the fluorine resin, the perfluoropolyether is preferable, because a film with higher chemical stability is easily formed. As long as the fluorine resin includes an ether bond and a fluorine group, a polymer compound with any other configuration except for the configurations represented by Chemical Formulas 1 to 6 may be used. The configuration of the fluorine resin (the kind of the polymer compound) may be specified by checking the bonding state of elements by, for example, X-ray photoelectron spectroscopy (XPS).

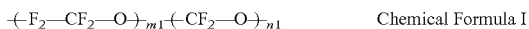

Chemical Formula 1 where m1 and n1 each are an integer of 1 or more.

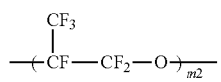

Chemical Formula 2 where m2 is an integer of 1 or more.

Chemical Formula 3 where m3 is an integer of 1 or more.

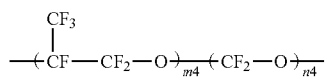

Chemical Formula 4 where m4 and n4 each are an integer of 1 or more.

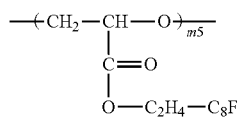

Chemical Formula 5 where m5 is an integer of 1 or more.

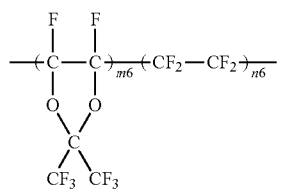

Chemical Formula 6 where m6 and n6 each are an integer of 1 or more.

The fluorine resin may be formed by any method such as a liquid-phase method. Among them, a liquid-phase method such as a spraying method or an immersion method is preferable, and the immersion method is more preferable. It is because the fluorine resin is easily intruded into pores.

The anode active material layer 2 may include only one or a combination of two or more kinds selected from the above-described oxide-containing film, the above-described metal material and the above-described fluorine resin. However, when only one of them is included, the oxide-containing film is preferable, because the oxide-containing film formed by a liquid-phase method such as a liquid-phase deposition method is intruded into pores more easily than the metal material formed by a liquid-phase method such as an electrolytic plating method and the fluorine resin formed by a liquid-phase method such as an immersion method.

The anode active material may be any one of the simple substance, an alloy and a compound of silicon, or may include a phase including one kind or two or more kinds selected from them at least in part. Only one kind or a mixture of two or more kinds selected from them may be used.

In the present invention, the alloy means an alloy including two or more kinds of metal elements as well as an alloy including one or more kinds of metal elements and one or more kinds of metalloid elements. Moreover, the alloy may include a non-metal element. As the texture of the alloy, a solid solution, a eutectic (eutectic mixture), an intermetallic compound or the coexistence of two or more kinds selected from them is cited.

As an alloy of silicon, for example, an alloy including at least one kind selected from the group consisting of tin, nickel, copper, iron, cobalt, manganese (Mn), zinc, indium (In), silver (Ag), titanium, germanium, bismuth (Bi), antimony (Sb) and chromium as an element in addition to silicon is cited.

As a compound of silicon, for example, a compound including oxygen and carbon (C) as elements in addition to silicon, or the like is cited. The compound of silicon may include one kind or two or more kind of the elements described in the alloy of silicon as elements in addition to silicon.

For example, the anode active material is attached to the anode current collector 1, and is grown from the surface of the anode current collector 1 in the thickness direction of the anode active material layer 2. In this case, the anode active material is formed by a vapor-phase method, and as described above, the anode current collector 1 and the anode active material layer 2 are preferably alloyed at least in a part of an interface therebetween. More specifically, the elements of the anode current collector 1 may be diffused into the anode active material in the interface, or the elements of the anode active material may be diffused into the anode current collector 1 in the interface, or they may be diffused into each other in the interface. It is because it is difficult to cause a fracture in the anode active material layer 2 due to swelling and shrinkage thereof during electrode reaction, and electron conductivity between the anode current collector 1 and the anode active material layer 2 is improved.

As the above-described vapor-phase method, for example, a physical deposition method or a chemical deposition method, more specifically, a vacuum deposition method, a sputtering method, an ion plating method, a laser ablation method, a thermal CVD (Chemical Vapor Deposition) method, a plasma chemical vapor deposition method or the like is cited.

Moreover, the anode active material may have the form of a plurality of particles. The anode active material may be formed by one deposition step to have a single-layer configuration, or may be formed by a plurality of deposition steps to have a multilayer configuration in particles. However, in the case where the anode active material is formed by an evaporation method accompanied by high heat during deposition, to prevent the anode current collector 1 from suffering heat damage, the anode active material preferably has a multilayer configuration. It is because when the step of depositing the anode active material is divided into several times to be performed (the anode active material is successively formed to be deposited), compared to the case where the deposition step is performed only once, the time that the anode current collector 1 is exposed to high heat is reduced.

In particular, the anode active material preferably includes oxygen as an element. It is because swelling and shrinkage of the anode active material layer 2 are prevented. In the anode active material layer 2, at least a part of oxygen is preferably bonded to a part of silicon. In this case, bonding between oxygen and silicon may be in the state of silicon monoxide or silicon dioxide, or in any other metastable state.

The oxygen content in the anode active material is preferably within a range from 3 at % to 40 at % both inclusive, because a higher effect is obtained. More specifically, when the oxygen content is smaller than 3 at %, there is a possibility that swelling and shrinkage of the anode active material layer 2 are not sufficiently prevented, and when the oxygen content is larger than 40 at %, there is a possibility that resistance is increased too much. In the case where the anode is used with an electrolytic solution in an electrochemical device, a coating formed by the decomposition of the electrolytic solution is not included in the anode active material. In other words, in the case where the oxygen content in the anode active material is determined by calculation, oxygen in the above-described coating is not included.

For example, in the case where the anode active material is formed by a vapor-phase method, the anode active material including oxygen may be formed by continuously introducing an oxygen gas into a chamber. In particular, in the case where a desired oxygen content is not obtained only by introducing the oxygen gas, a liquid (for example, water vapor or the like) may be introduced into the chamber as a supply source of oxygen.

Moreover, the anode active material preferably includes at least one kind of metal element selected from the group consisting of iron, cobalt, nickel, titanium, chromium and molybdenum. It is because binding in the anode active material is improved, and swelling and shrinkage of the anode active material layer 2 are prevented, and the resistance of the anode active material is reduced. The content of the metal element in the anode active material is freely settable. However, in the case where the anode is used in a battery, when the content of the metal element is too large, to obtain a desired battery capacity, it is necessary to increase the thickness of the anode active material layer 2, so the anode active material layer 2 may be peeled from the anode current collector 1, or the anode active material layer 2 may be cracked.

The anode active material including the above-described metal element may be formed by using an evaporation source in which a metal element is mixed, or a multicomponent evaporation source when the anode active material is formed by an evaporation method as a vapor-phase method.

The anode active material includes an oxygen-containing region including oxygen in its thickness direction, and the oxygen content in the oxygen-containing region is preferably higher than the oxygen content in a region other than the oxygen-containing region. It is because swelling and shrinkage of the anode active material layer 2 are prevented. The region other than the oxygen-containing region may or may not include oxygen. In the case where the region other than the oxygen-containing region includes oxygen, the oxygen content in the region other than the oxygen-containing region is lower than that in the oxygen-containing region.

In this case, to prevent swelling and shrinkage of the anode active material layer 2, it is preferable that the region other than the oxygen-containing region includes oxygen, and the anode active material includes a first oxygen-containing region (a region having a lower oxygen content) and a second oxygen-containing region having a higher oxygen content than the first oxygen-containing region (a region having a higher oxygen content). In this case, the second oxygen-containing region is preferably sandwiched by the first oxygen-containing region, and more preferably, the first oxygen-containing region and the second oxygen-containing region are alternately laminated. It is because a higher effect is obtained. The oxygen content in the first oxygen-containing region is preferably as low as possible, and, for example, the oxygen content in the second oxygen-containing region is equal to the oxygen content in the case where the above-described anode active material includes oxygen.

The anode active material including the first and second oxygen-containing regions may be formed by intermittently introducing an oxygen gas into a chamber, or changing the amount of the oxygen gas introduced into the chamber in the case where the anode active material is formed by, for example, a vapor-phase method. In the case where a desired oxygen content is not obtained only by introducing the oxygen gas, a liquid (for example, a water vapor or the like) may be introduced into the chamber.

The oxygen contents in the first and second oxygen-containing regions may or may not be distinctly different from each other. In particular, in the case where the amount of the above-described oxygen gas introduced is continuously changed, the oxygen content may be also continuously changed. In the case where the amount of the oxygen gas introduced is intermittently changed, the first and second oxygen-containing regions become so-called "layers", and in the case where the amount of the oxygen gas introduced is continuously changed, the first and second oxygen-containing regions become "laminar" rather than "layers". In the latter case, the oxygen content in the anode active material is distributed while the oxygen content changed up and down repeatedly. In this case, the oxygen content is preferably changed step by step or continuously between the first and second oxygen-containing regions. When the oxygen content is rapidly changed, ion diffusion may decline or resistance may be increased.

Referring to FIGS. 2A and 2B to 7, specific configurations before and after electrode reaction of the anode in the case where a particulate anode active material has a multilayer configuration in its particles will be described below. In addition, "after electrode reaction" which will be described later means a state after at least one electrode reaction occurs.

Figure 2A:
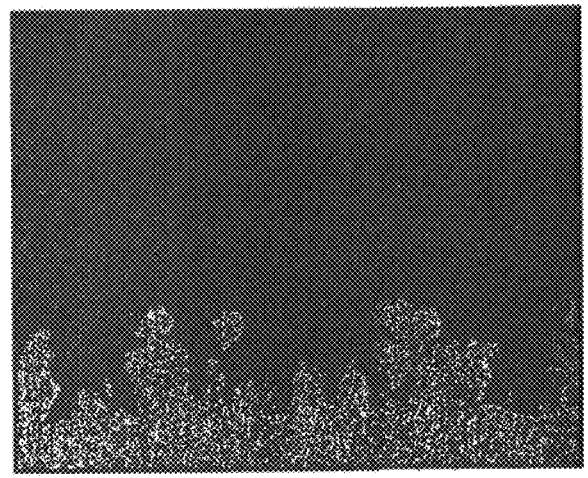
FIGS. 2A and 2B are an SEM photograph and a schematic view showing a sectional configuration of the anode shown in FIG. 1 before electrode reaction.
Figure 2B:
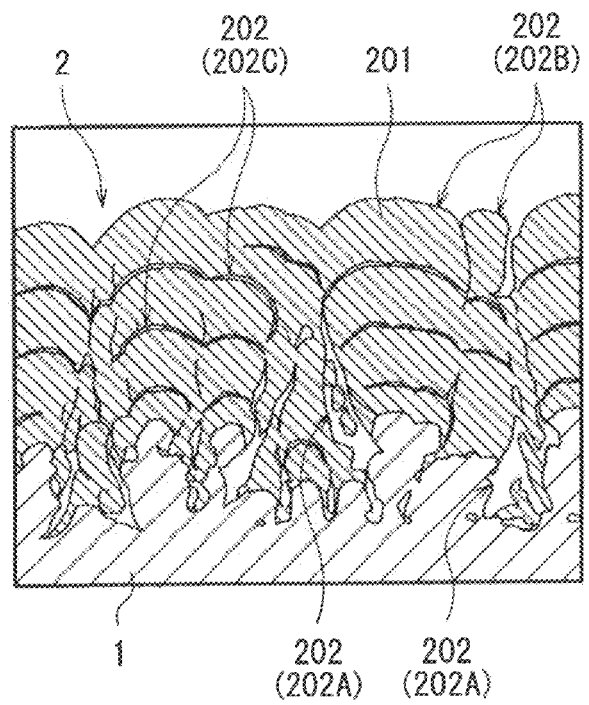

FIGS. 2A and 2B show enlarged sectional views of the anode before electrode reaction, and FIG. 2A shows a scanning electron microscope (SEM) photograph (a secondary electron image), and FIG. 2B shows a schematic view of the SEM image shown in FIG. 2A. FIGS. 2A and 2B show the case where the anode active material has a multilayer configuration, and the anode active material layer 2 does not include an embedding material such as the oxide-containing film.

Before electrode reaction, as shown in FIGS. 2A and 2B, as the anode active material includes a plurality of particles (anode active material particles 201), the anode active material includes a plurality of pores 202. More specifically, on the roughened surface of the anode current collector 1, a plurality of projections (for example, fine particles formed by electrolytic treatment) are present. In this case, the anode active material is deposited on the surface of the anode current collector 1 a plurality of times by a vapor-phase method or the like so as to grow the anode active material particles 201 step by step in a thickness direction on each of the above-described projections. Because of the closely packed configuration of the plurality of anode active material particles 201, the multilayer configuration and the surface configuration, a plurality of pores 202 are formed.

The pores 202 include three kinds, that is, pores 202A, 202B and 202C classified by causes of formation. The pores 202A are gaps formed between the anode active material particles 201 growing on each projection which is present on the surface of the anode current collector 1. The pores 202B are gaps formed between small stubble-shaped projections (not shown) which are formed on the surfaces of the anode active material particles 201. The pores 202B may be formed on the whole exposed surfaces of the anode active material particles 201, or a part of the exposed surfaces of the anode active material particles 201. As the anode active material particles 201 have a multilayer configuration, the pores 202C are gaps formed between layers of the multilayer configuration. The above-described small stubble-shaped projections are formed on the surfaces of the anode active material particles 201 in each formation of the anode active material particles 201, so the pores 202B are formed not only on the exposed surfaces (the outer surfaces) of the anode active material particles 201 but also between layers. The pores 202 may include any other pores formed because of any other cause of formation except for the above-described causes of formation.

Figure 3A:
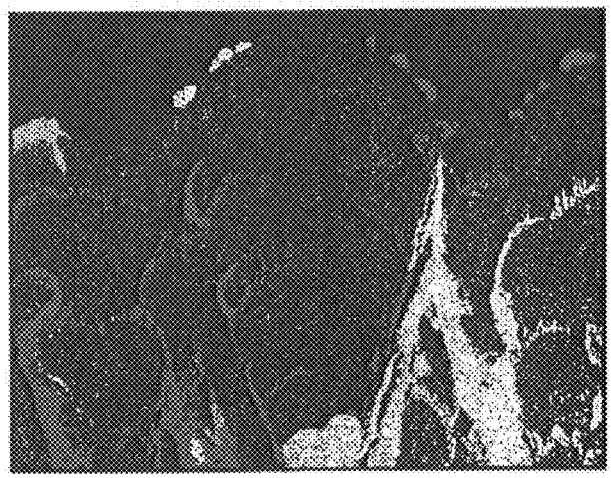
FIGS. 3A and 3B are an SEM photograph and a schematic view showing another sectional configuration of the anode shown in FIG. 1 before electrode reaction.
Figure 3B:
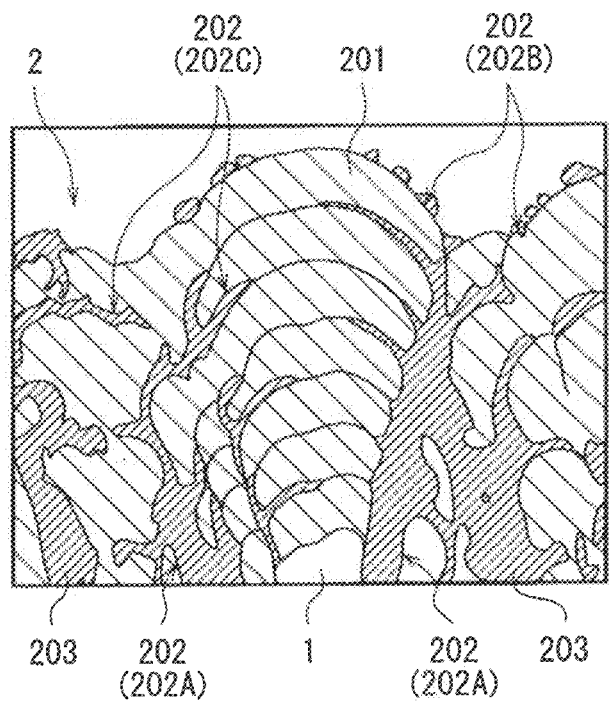

FIGS. 3A and 3B show other sectional views of the anode before electrode reaction, and correspond to FIGS. 2A and 2B, respectively. In FIGS. 3A and 3B, the case where the anode active material layer 2 includes a metal material not alloyed with an electrode reactant as an embedding material is shown. As shown in FIGS. 3A and 3B, when a metal material 203 is formed by a liquid-phase method or the like after a plurality of anode active material particles 201 are formed, the metal material 203 is intruded into the pores 202. In other words, the metal material 203 is intruded into gaps (the pores 202A) between adjacent anode active material particles 201, gaps (the pores 202B) between small stubble-shaped projections formed on the surfaces of the anode active material particles 201, and gaps (the pores 202C) in the anode active material particles 201. In FIGS. 3A and 3B, dotting the metal material 203 around the surfaces of the anode active material particles 202 in the outermost layer means that the above-described small projections are present in positions where the metal material 203 is dotted.

As shown in FIGS. 2A, 2B, 3A and 3B, in the case where the particulate anode active material has a multilayer configuration in its particles, the plurality of pores 202 include the pores 202A, 202B and 202C. On the other hand, in the case where the particulate anode active material does not have a multilayer configuration in its particles (that is, has a single-layer configuration), the pores 202C are not formed, so the plurality of pores 202 include only pores 202A and 202B.

Although specific description is not given referring to drawings here, in the case where instead of the metal material, the oxide-containing film is formed by a liquid-phase deposition method or the like, the oxide-containing film is grown along the surfaces of the anode active material particles 201, so the oxide-containing film is preferentially intruded into the pores 202B and 202C. In this case, when the deposition time is increased, the oxide-containing film is intruded into the pores 202A. Moreover, in the case where the fluorine resin is formed by an immersion method or the like, as in the case of the metal material, the fluorine resin is easily intruded into the pores 202A, 202B and 202C, and when the immersion time is increased, the fluorine resin is intruded into the pores 202B and 202C more easily.

Figure 7:
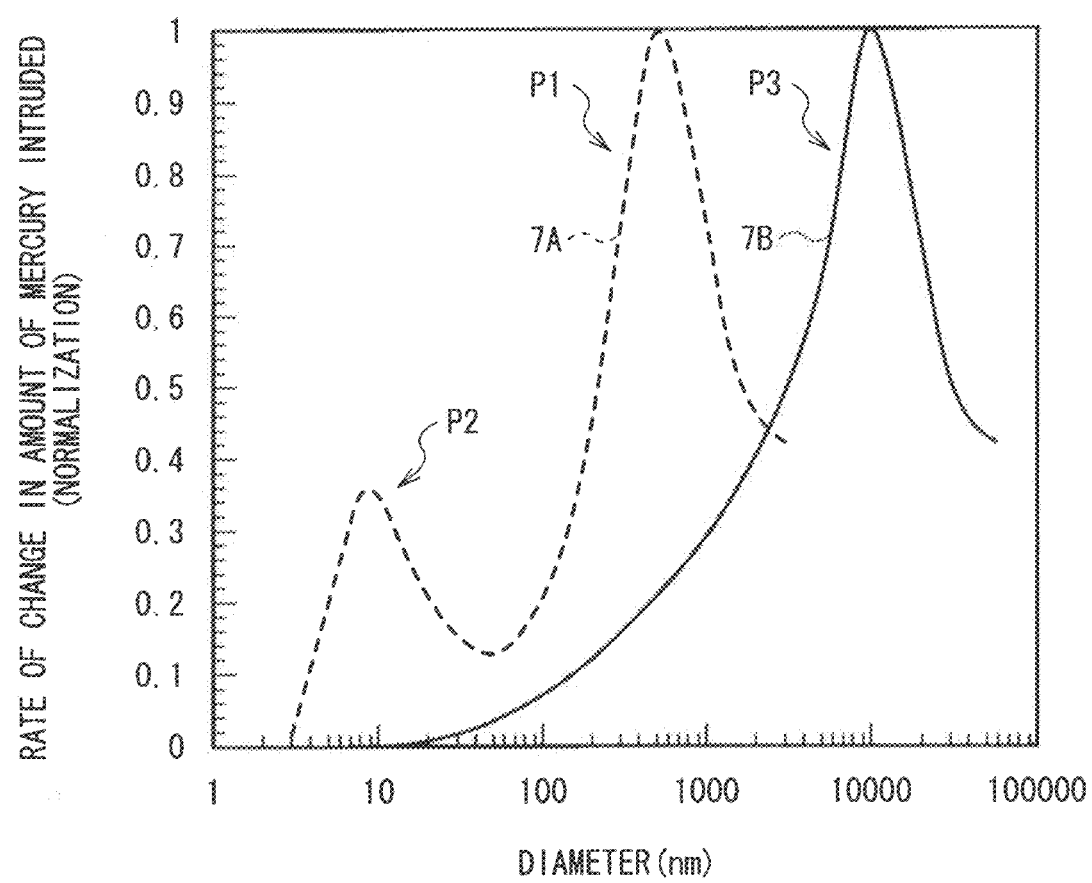
FIG. 7 is a chart showing the distribution of the rate of change in the amount of mercury intruded before and after electrode reaction.

FIG. 7 shows the distribution of the rate of change in the amount of mercury intruded before and after electrode reaction, and the horizontal axis indicates the diameter (nm) of the pore 202 and the vertical axis indicates the rate of change in the amount of mercury intruded into a plurality of pores 202. When the amount V of mercury intruded into a plurality of pores 202 is measured before electrode reaction while increasing a pressure P by a mercury porosimeter, the rate of change ($\Delta V/\Delta P$) in the amount of mercury intruded is distributed as shown by a reference numeral 7A (a broken line) in FIG. 7. The rate of change in the amount of mercury intruded is distributed so as to have two peaks P1 and P2 in a diameter range from 3 nm to 100000 nm both inclusive which is measurable by a mercury porosimeter. The peak P1 on a wide diameter side is formed mainly because of the presence of the pores 202A, and a diameter range where the peak P1 is formed is approximately from 50 nm to 3000 nm both inclusive. On the other hand, the peak P2 on a narrow diameter side is formed mainly because of the presence of the pores 202B and 202C, and a diameter range where the peak P2 is formed is approximately from 3 nm to 50 nm both inclusive. The rate of change (7A) in the amount of mercury intruded shown in FIG. 7 is a normalized value under the condition that the rate of change at the peak P1 is 1.

Figure 4A:
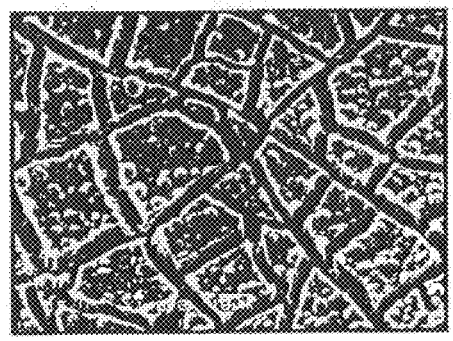
FIGS. 4A and 4B are an SEM photograph and a schematic view showing a surface particle configuration of an anode active material layer shown in FIG. 1 after electrode reaction.
Figure 4B:
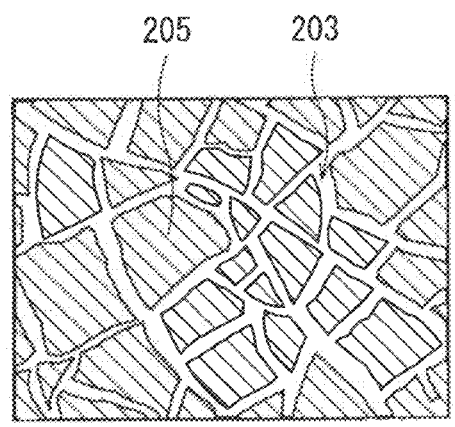
Figure 5A:
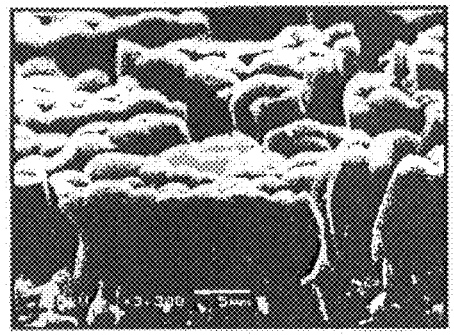
FIGS. 5A and 5B are an SEM photograph and a schematic view showing a sectional configuration of the anode active material layer shown in FIGS. 4A and 4B.
Figure 5B:
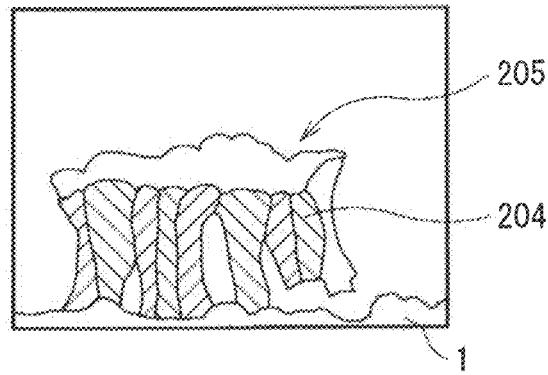
Figure 6A:
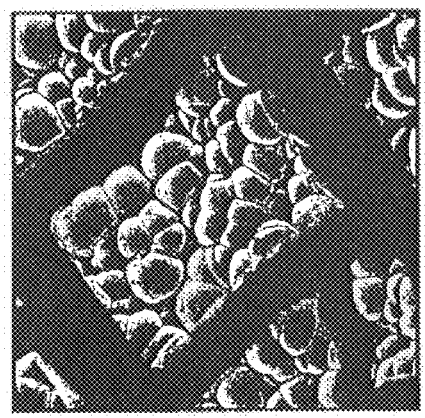
FIGS. 6A and 6B are an SIM photograph and a schematic view showing an enlarged configuration of a part of the surface of the anode active material layer shown in FIGS. 4A and 4B.
Figure 6B:
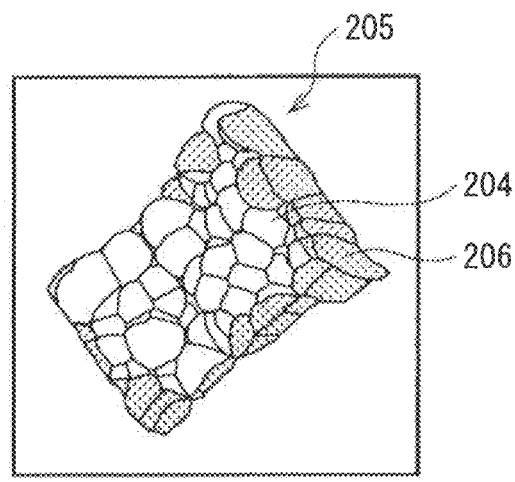

FIGS. 4A and 4B to 6A and 6B show particle configurations of the anode active material layer 2 after electrode reaction. Among them, FIGS. 4A and 4B show surface particle configurations, and FIGS. 5A and 5B show sectional particle configurations. FIGS. 4A and 5A show SEM photographs, and FIGS. 4B and 5B show schematic views of SEM images shown in FIGS. 4A and 5A. FIGS. 6A and 6B show enlarged views of a part of the particle configurations shown in FIGS. 4A and 4B, and FIG. 6A shows a scanning ion microscope (SIM) photograph, and FIG. 6B shows a schematic view of an SIM image shown in FIG. 6A. In FIGS. 4A and 4B to 6A and 6B, the case where the anode active material has a single-layer configuration is shown.

As shown in FIGS. 4A and 4B to 6A and 6B, in the anode active material layer 2, after electrode reaction, a plurality of primary particles 204 form secondary particles 205 and split particles 206. More specifically, in the SEM photograph shown in FIG. 4A, parts corresponding to hatched parts in FIG. 4B are secondary particles 205, and particulate matters in the secondary particles 205 are primary particles 204. In the SEM photograph shown in FIG. 5A, parts corresponding to hatched parts in FIG. 5B are primary particles 204 (the anode active material with a single-layer configuration). The secondary particles 205 are separated in the in-plane direction of the anode active material layer 2 by grooves 203 having a depth in the thickness direction of the anode active material layer 2. At this time, as shown in FIGS. 5A, 5B, 6A and 6B, the primary particles 204 are not simply adjacent to one another, but at least some of the primary particles are bonded together to form secondary particles 205, and the grooves 203 almost reach the anode current collector 1. The depths of the grooves 203 are, for example, 5 μm or over. The grooves 203 are formed by electrode reaction (charge-discharge reaction in the case where the anode is used in a battery), and the grooves 203 are not formed along the primary particles 204, but the grooves 203 are substantially linearly formed in the thickness direction of the anode active material layer 2. Thereby, as shown in FIGS. 4A, 4B, 6A and 6B, some of the primary particles 204 are split by the grooves 203 to form the split particles 206. In the SIM photograph shown in FIG. 6A, parts corresponding to hatched parts shown in FIG. 6B are the split particles 206.

These particle configurations may be observed by SEM as shown in FIGS. 4A and 5A or by SIM shown in FIG. 6A. Moreover, a section to be observed is preferably formed by cutting the anode active material by a focused ion beam (FIB) or a microtome.

When the rate of change in the amount of mercury intruded is measured after electrode reaction by a mercury porosimeter as in the case where the rate of change in the amount of mercury intruded is measured before electrode reaction, the rate of change in the amount of mercury intruded is distributed as shown by a reference numeral 7B (a solid line) shown in FIG. 7. The rate of change in the amount of mercury intruded is distributed so as to have one peak P3 in a measurable diameter range from 3 nm to 100000 nm both inclusive. The peak P3 is formed mainly because of the presence of the grooves 203, and the diameter range where the peak P3 is present is from 200 nm to 15000 nm both inclusive as described above. The rate of change in the amount of mercury intruded (7B) is a normalized value under the condition that the rate of change at the peak P3 is 1.

As shown in FIG. 7, the reason why the distribution of the rate of change in the amount of mercury intruded is changed before and after electrode reaction is that the internal configuration of the anode active material layer 2 is changed by the electrode reaction. More specifically, during charge and discharge, the particle configuration of the anode active material layer 2 is dynamically changed by a stress according to swelling and shrinkage of the anode active material layer 2, and in the case where the anode is used with an electrolytic solution in an electrochemical device, a so-called SEI (Solid Electrolyte Interface) film is formed, thereby the pores 202A to 202C are easily filled. This tendency becomes more pronounced when an imbedding material such as the above-described oxide-containing film is formed. Moreover, during charge and discharge, a plurality of primary particles 204 are aggregated to form secondary particles 205 (including the split particles 206), so the grooves 203 having a larger diameter than the pores 202A are newly formed accordingly. The above-described "SEI film" is a film formed between an anode and a nonaqueous solvent-based electrolytic solution when an irreversible reaction occurs between the anode active material and the electrolytic solution during initial charge in the electrolytic solution. The SEI film forms a stable interface having the conductivity of electrode reactant ions between the anode and the electrolytic solution and not having electron conductivity between the anode and the electrolytic solution, and the SEI film includes a decomposition product of the electrolytic solution.

The anode may be manufactured by the following steps, for example.

At first, after the anode current collector 1 is prepared, if necessary, roughening treatment is subjected to the surface of the anode current collector 1. In this case, the anode current collector 1 which is already roughened may be used.

Next, silicon as the anode active material is deposited on the anode current collector 1 by a vapor-phase method or the like to form the anode active material layer 2. In the case where the anode active material is deposited, the anode active material may be formed by one deposition step to have a single-layer configuration, or the anode active material may be formed by a plurality of deposition steps to have a multilayer configuration. In the case where the anode active material is formed by a vapor-phase method to have a multilayer configuration, silicon may be deposited successively while the anode current collector 1 is moved back and forth relatively to an evaporation source, or silicon may be deposited successively while the anode current collector 1 is fixed relative to the evaporation source, and a shutter is repeatedly opened and closed. In the case where the anode active material layer 2 is formed, if necessary, an imbedding material such as the oxide-containing film, the metal material not alloyed with an electrode reactant or the fluorine resin may be formed by a liquid-phase method or the like.

Finally, at least one electrode reaction is performed, thereby a plurality of secondary particles 205 (including the split particles 206) separated by the grooves 203 are formed in the anode active material layer 2. In this case, after the electrode reaction, the volumetric capacity of the small pore group per unit weight of silicon is 0.3 cm$^3$/g or less, and the rate of change in the amount of mercury intruded into a plurality of pores which is measured by mercury porosimetry has a peak in a diameter range from 200 nm to 15000 nm both inclusive. Thereby, the anode is completed.

In the case where the anode is manufactured, for example, the volumetric capacity of the small pore group per unit weight of silicon, or the diameter at which the rate of change in the amount of mercury intruded has a peak is adjustable by the following method.

To adjust the volumetric capacity of the small pore group per unit weight of silicon, in the case where the imbedding material such as the oxide-containing film is formed, the formation time is changed. The formation time means deposition time in the case where the oxide-containing film is formed by a liquid-phase deposition method, plating time in the case where the metal material is formed by a plating method, and immersion time in the case where the fluorine resin is formed by an immersion method. In any of the cases, the volumetric capacity of the small pore group per unit weight of silicon is changeable depending on the formation time.

On the other hand, to adjust the diameter at which the rate of change in the amount of mercury intruded has a peak, a various kinds of gases such as a carbon dioxide gas or an inert gas are introduced into a chamber, and the amounts of gases introduced are changed. Moreover, in the case where the anode active material is deposited by a vapor-phase method, the substrate temperature is changed. Further, in the case where the anode active material is deposited while the anode current collector 1 is moved relatively to an evaporation source, the movement rate of the anode current collector 1 is changed. In any of the cases, the diameter at which the rate of change in the amount of mercury intruded has a peak is changeable depending on the amounts of gases introduced, the substrate temperature or the movement rate of the anode current collector 1.

In the anode, in the case where the anode active material including silicon includes a plurality of pores, after electrode reaction, the volumetric capacity of the small pore group (a pore group with a diameter ranging from 3 nm to 200 nm both inclusive) per unit weight of silicon is 0.3 cm$^3$/g or less, and the rate of change in the amount of mercury intruded into pores which is measured by mercury porosimetry is distributed so as to have a peak in a diameter range from 200 nm to 15000 nm both inclusive. In this case, compared to the case where the volumetric capacity of the small pore group per unit weight of silicon and the diameter at which the rate of change in the amount of mercury intruded has a peak are out of the ranges, even in the case where during electrode reaction, the anode active material has high activity, and is easily swelled or shrunk, the anode active material is less prone to reacting with another material, and the anode active material layer 2 is less prone to being peeled from the anode current collector 1. Therefore, the anode may contribute to an improvement in the cycle characteristics of an electrochemical device using the anode.

In particular, the volumetric capacity of the small pore group per unit weight of silicon and the diameter at which the rate of change in the amount of mercury intruded has a peak are within a range of 0.1 cm$^3$/g or less, and a range from 700 nm to 12000 nm both inclusive, respectively, more specifically 0 cm$^3$/g and within a range from 1000 nm to 10000 nm both inclusive, respectively, the cycle characteristics may be improved.

Moreover, when the imbedding material such as the oxide-containing film, the metal material not alloyed with an electrode reactant or the fluorine resin is included in the pores, even in the case where the volumetric capacity of the small pore group per unit weight of silicon is inherently out of the above-described range, the volumetric capacity of the small pore group may be easily controlled within the range. In this case, when the oxide-containing film is formed by a liquid-phase method such as a liquid-phase deposition method, or when the metal material not alloyed with an electrode reactant is formed by a liquid-phase method such as an electrolytic plating method, or when the fluorine resin is formed by a liquid-phase method such as an immersion method, the imbedding material is easily intruded into pores, so a higher effect may be obtained.

In the case where it takes time to form the above-described imbedding material, when a reduction in the time for manufacturing the anode and an improvement in productivity are emphasized, the volumetric capacity of the small pore group per unit weight of silicon is preferably as large as possible within the above-described range, more specifically the volumetric capacity is preferably 0.3 $cm^3/g$ or less.

In particular, when the anode active material includes oxygen, and the oxygen content in the anode active material is within a range from 3 at % to 40 at % both inclusive, or when the anode active material includes at least one kind of metal element selected from the group consisting of iron, cobalt, nickel, titanium, chromium and molybdenum, or when the anode active material particles include an oxygen-containing region (a region including oxygen in which the oxygen content is higher than that in a region other than the region) in its thickness direction, the cycle characteristics may be further improved.

Moreover, when the surface facing the anode active material layer 2 of the anode current collector 1 is roughened by fine particles formed by electrolytic treatment, adhesion between the anode current collector 1 and the anode active material layer 2 may be improved. In this case, when the ten-point height of roughness profile Rz of the surface of the anode current collector 1 is within a range from 1.5 µm to 6.5 µm both inclusive, the cycle characteristics may be further improved.

Next, application examples of the above-described anode will be described below. As an example of the electrochemical device, a battery is used, and the anode is used in the battery as below.

First Battery

Figure 8:
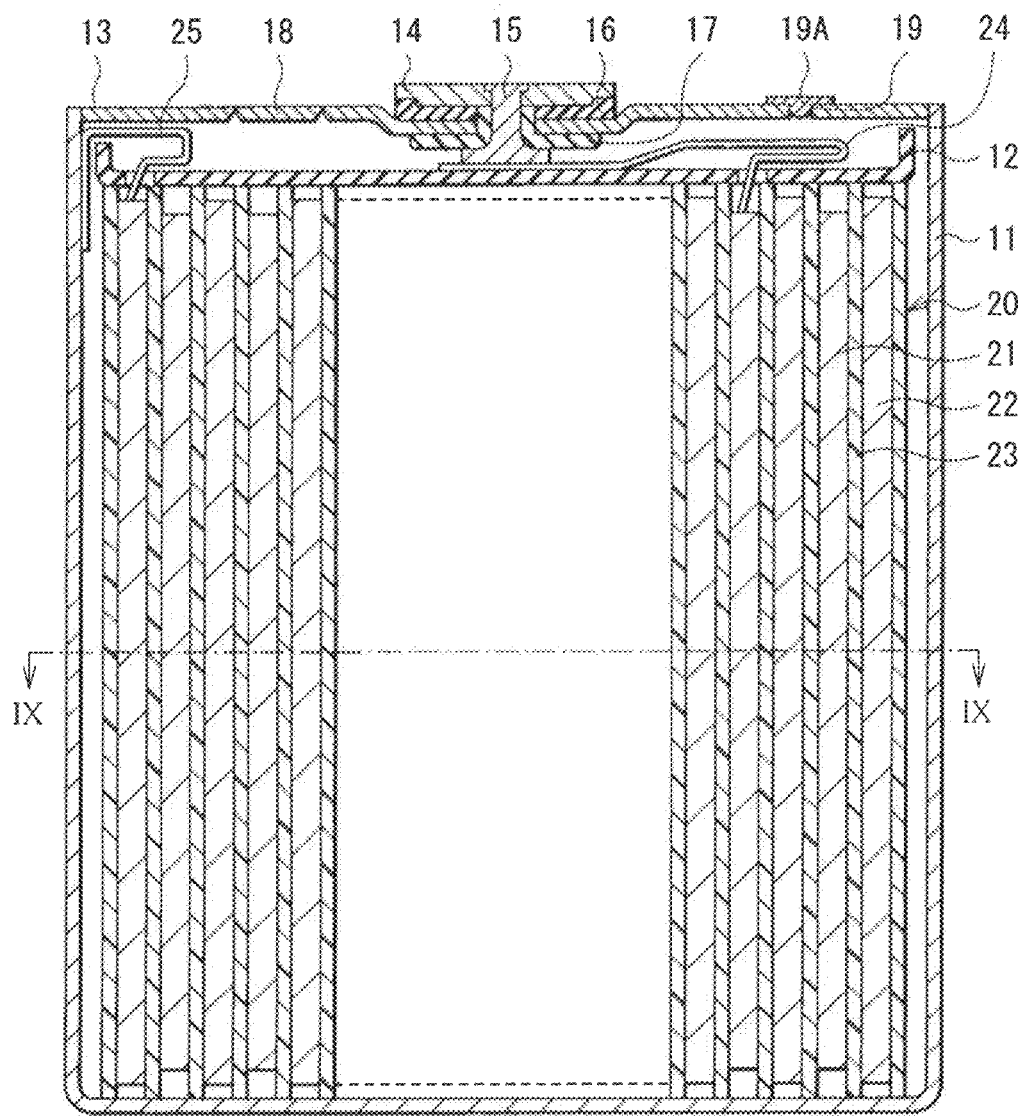
FIG. 8 is a sectional view showing the configuration of a first battery including the anode according to the embodiment of the invention.
Figure 9:
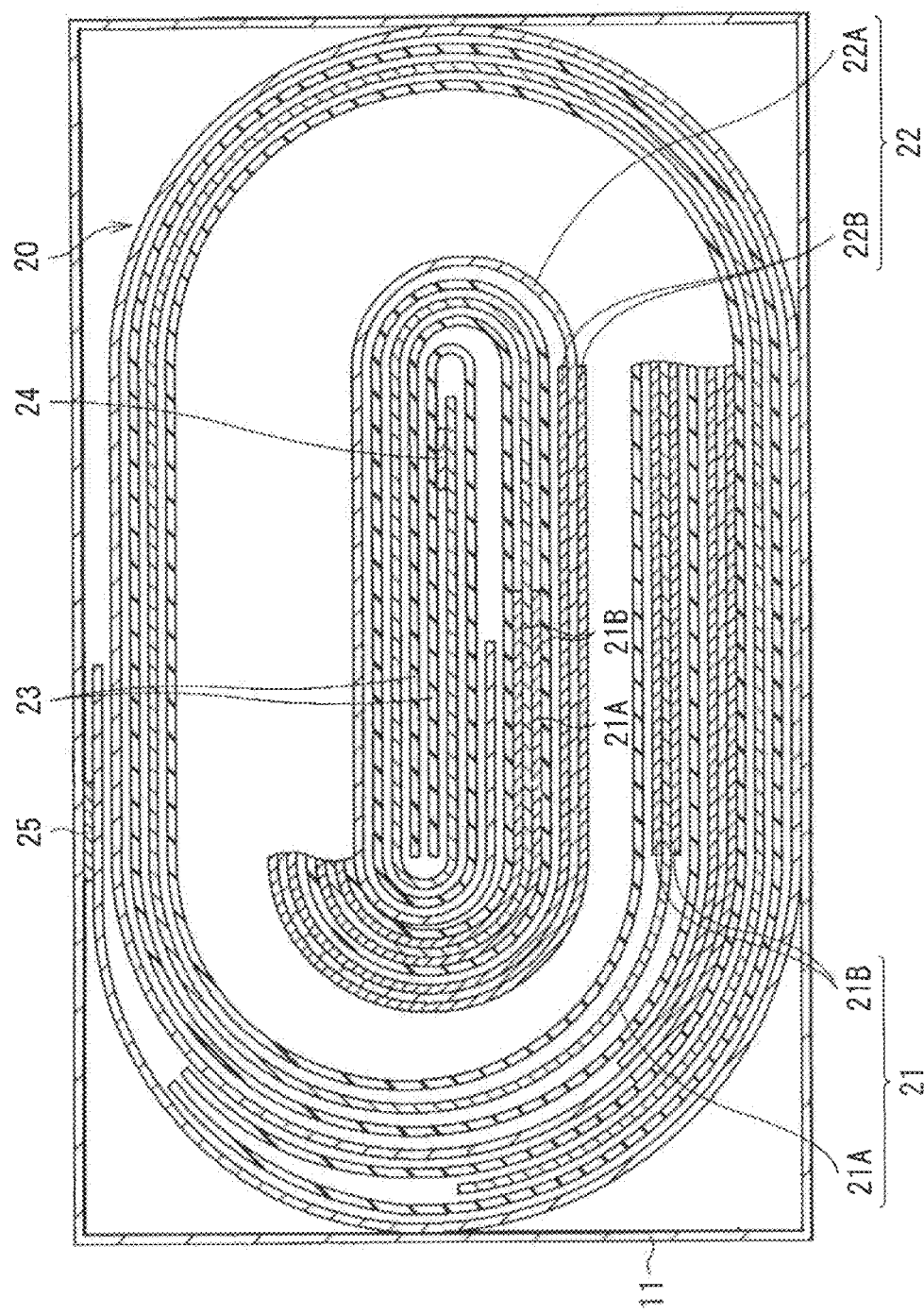
FIG. 9 is a sectional view of the first battery taken along a line IX-IX of FIG. 8.

FIGS. 8 and 9 show sectional views of a first battery, and FIG. 9 shows a sectional view taken along a line IX-IX of FIG. 8. The battery described here is, for example, a lithium-ion secondary battery in which the capacity of an anode 22 is represented based on insertion and extraction of lithium as an electrode reactant.

The secondary battery contains a battery element 20 having a flat winding configuration in a battery can 11.

The battery can 11 is, for example, a prismatic package member. The battery configuration using the prismatic package can 11 is called a prismatic type. As shown in FIG. 9, in the prismatic package member, a sectional surface in a longitudinal direction has a rectangular shape or a substantially rectangular shape (including a curve in part), and the prismatic package member forms not only a prismatic battery with a rectangular shape but also a prismatic battery with an oval shape. In other words, the prismatic package member is a vessel-shaped member having a rectangular closed end or a oval closed end and an opening with a rectangular shape or a substantially rectangular (an oval) shape formed by connecting arcs with straight lines. In FIG. 9, the battery can 11 having a rectangular sectional surface is shown.

The battery can 11 is made of, for example, a material including iron or aluminum (Al), or an alloy thereof, and may have a function as an electrode terminal. In this case, to prevent swelling of the secondary battery through the use of the hardness (resistance to deformation) of the battery can 11 during charge and discharge, iron which is harder than aluminum is preferable. In the case where the battery can 11 is made of iron, for example, iron may be plated with nickel or the like.

Moreover, the battery can 11 has a hollow configuration having an open end and a closed end, and an insulating plate 12 and a battery cover 13 are attached to the open end, and the battery can 11 is sealed. The insulating plate 12 is arranged between the battery element 20 and the battery cover 13 in a direction perpendicular to a peripheral winding surface of the battery element 20, and the insulating plate 12 is made of, for example, polypropylene or the like. The battery cover 13 is made of, for example, the same material as that of the battery can 11, and may have a function as an electrode terminal in the same manner.

A terminal plate 14 which becomes a cathode terminal is arranged outside of the battery cover 13, and the terminal plate 14 is electrically insulated from the battery cover 13 by an insulating case 16. The insulating case 16 is made of, for example, polybutylene terephthalate or the like. Moreover, a through hole is provided around the center of the battery cover 13, and a cathode pin 15 is inserted into the through hole so as to be electrically connected to the terminal plate 14 and to be electrically insulated from the battery cover 13 by a gasket 17. The gasket 17 is made of, for example, an insulating material, and its surface is coated with asphalt.

A cleavage valve 18 and an injection hole 19 are arranged around an edge of the battery cover 13. The cleavage valve 18 is electrically connected to the battery cover 13, and when an internal pressure in the secondary battery increases to a certain extent or higher due to an internal short circuit or external application of heat, the cleavage valve 18 is separated from the battery cover 13 to release the internal pressure. The injection hole 19 is filled with a sealing member 19A made of, for example, a stainless steel ball.

The battery element 20 is formed by laminating a cathode 21 and an anode 22 with a separator 23 in between, and spirally winding them, and has a flat shape according to the shape of the battery can 11. A cathode lead 24 made of aluminum or the like is attached to an end (for example, an inside end) of the cathode 21, and an anode lead 25 made of nickel or the like is attached to an end (for example, an outside end) of the anode 22. The cathode lead 24 is welded to an end of the cathode pin 15 to be electrically connected to the terminal plate 14, and the anode lead 25 is welded and electrically connected to the battery can 11.

The cathode 21 is formed by arranging a cathode active material layer 21B on both sides of a strip-shaped cathode current collector 21A. The cathode active material layer 21B may be formed on only one side of the cathode current collector 21A. The cathode current collector 21A is made of, for example, a material such as aluminum, nickel or stainless. The cathode active material layer 21B includes one kind or two or more kinds of materials capable of inserting extracting lithium as cathode active materials, and may include any other material such as a binder or an electrical conductor, if necessary.

As the materials capable of inserting and extracting lithium, a lithium-containing compound is preferable, because a high energy density is obtained. Examples of the lithium-containing compound include a complex oxide including lithium and a transition metal element and a phosphate compound including lithium and a transition metal element, and in particular, as the transition metal element, at least one kind selected from the group consisting of cobalt, nickel, manganese and iron is preferably included, because a higher voltage is obtained. The complex oxide or the phosphate compound is represented by, for example, $Li_xM1O_2$ or $Li_yM2PO_4$. In the chemical formulas, M1 and M2 represent one or more kinds of transition metal elements. The values of x and y depend on a charge-discharge state of the battery, and are generally within a range of $0.05 \leq x \leq 1.10$ and $0.05 \leq y \leq 1.10$, respectively.

Examples of the lithium complex oxide including lithium and a transition metal element include lithium-cobalt complex oxide ($Li_xCoO_2$), lithium-nickel complex oxide ($Li_xNiO_2$), lithium-nickel-cobalt complex oxide ($Li_xNi_{(1-z)}Co_zO_2$ (z<1)), lithium-nickel-cobalt-manganese complex oxide ($Li_xNi_{(1-v-w)}Co_vMn_wO_2$ (v+w<1)), lithium-manganese complex oxide ($LiMn_2O_4$) having a spinel structure and the like. Among them, a complex oxide including nickel is preferable. It is because a high capacity is obtained, and superior cycle characteristics are obtained. Examples of the phosphate compound including lithium and a transition metal element include a lithium-iron phosphate compound ($LiFePO_4$), a lithium-iron-manganese phosphate compound ($LiFe_{(1-u)}Mn_uPO_4$ (u<1)) and the like.

In addition to the above-described materials, as the material capable of inserting and extracting lithium, for example, an oxide such as titanium oxide, vanadium oxide or manganese dioxide, a bisulfide such as iron bisulfide, titanium bisulfide or molybdenum sulfide, a chalcogenide such as niobium selenide, or a conductive polymer such as polyaniline or polythiophene is cited.

The anode 22 has the same configuration as that of the above-described anode, and is formed by arranging an anode active material layer 22B on both sides of a strip-shaped anode current collector 22A. The configurations of the anode current collector 22A and the anode active material layer 22B are the same as those of the anode current collector 1 and the anode active material layer 2 in the above-described anode, respectively. In the anode 22, the charge capacity of the anode active material capable of inserting and extracting lithium is preferably larger than the charge capacity of the cathode 21.

The separator 23 isolates between the cathode 21 and the anode 22 so that lithium ions pass therethrough while preventing a short circuit of a current due to contact between the cathode 21 and the anode 22. The separator 23 is made of, for example, a porous film of a synthetic resin such as polytetrafluoroethylene, polypropylene or polyethylene, a porous ceramic film or the like, and the separator 23 may have a configuration in which two or more kinds of the porous films are laminated.

The separator 23 is impregnated with an electrolytic solution as a liquid electrolyte. The electrolytic solution includes a solvent and an electrolyte salt dissolved in the solvent.

The solvent includes, for example, one kind or two or more kinds of nonaqueous solvents such as organic solvents. Examples of the nonaqueous solvents include carbonate-based solvents such as ethylene carbonate, propylene carbonate, butylene carbonate, dimethyl carbonate, diethyl carbonate, ethyl methyl carbonate and methyl propyl carbonate. It is because superior capacity characteristics, storage characteristics and cycle characteristics are obtained. Among them, as the solvent, a mixture of a high-viscosity solvent such as ethylene carbonate or propylene carbonate and a low-viscosity solvent such as dimethyl carbonate, ethyl methyl carbonate or diethyl carbonate is preferable. It is because the dissociation property of the electrolyte salt and ion mobility are improved, so a higher effect is obtained.

Moreover, the solvent preferably includes one kind or two or more kinds of halogenated carbonates. It is because a stable coating including a halogen is formed on a surface of the anode 22 to prevent decomposition of the electrolytic solution, thereby the cycle characteristics are improved. As the halogenated carbonate, a fluorinated carbonate is preferable, and difluoroethylene carbonate is more preferable than monofluoroethylene carbonate, because a higher effect is obtained. As the fluorinated carbonate, for example, 4-fluoro-1,3-dioxolane-2-one or the like is cited, and as difluoroethylene carbonate, for example, 4,5-difluoro-1,3-dioxolane-2-one or the like is cited.

Further, the solvent preferably includes one kind or two or more kinds of cyclic carbonates including an unsaturated bond, because the cycle characteristics are improved. Examples of the cyclic carbonate including an unsaturated bond include vinylene carbonate, vinyl ethylene carbonate and the like.

Moreover, the solvent preferably includes one kind or two or more kinds of sultones. It is because the cycle characteristics are improved, and swelling of the secondary battery is prevented. Examples of the sultone include 1,3-propene sultone and the like.

Further, the solvent preferably includes one kind or two or more kinds of acid anhydrides. It is because the cycle characteristics are improved. Examples of the acid anhydride include succinic anhydride, glutaric anhydride, maleic anhydride, sulfobenzoic anhydride, sulfopropionic anhydride, sulfobutyric anhydride, ethanedisulfonic anhydride, propanedisulfonic anhydride, benzenedisulfonic anhydride and the like. Among them, sulfobenzoic anhydride or sulfopropionic anhydride is preferable. It is because a high effect is obtained. The content of the acid anhydride in the solvent is preferably within a range from 0.5 wt % to 3 wt % both inclusive.

The electrolyte salt includes one kind or two or more kind of light metal salts such as lithium salt. Examples of the lithium salt include lithium hexafluorophosphate ($LiPF_6$), lithium perchlorate ($LiClO_4$), lithium hexafluoroarsenate ($LiAsF_6$) and the like. It is because superior capacity characteristics, storage characteristics and cycle characteristics are obtained. Among them, lithium hexafluorophosphate is preferable, because internal resistance is reduced, so a higher effect is obtained.

The electrolyte salt preferably includes a compound including boron and fluorine, because cycle characteristics are improved, and swelling of the secondary battery is prevented. Examples of the compound including boron and fluorine include lithium tetrafluoroborate and the like.

The content of the electrolyte salt in the solvent is, for example, within a range from 0.3 mol/kg to 3.0 mol/kg both inclusive, because superior capacity characteristics are obtained.

When the secondary battery is charged, for example, lithium ions are extracted from the cathode 21, and are inserted into the anode 22 through the electrolytic solution with which the separator 23 is impregnated. On the other hand, when the secondary battery is discharged, the lithium ions are extracted from the anode 22 and are inserted into the cathode 21 through the electrolytic solution with which the separator 23 is impregnated.

The secondary battery may be manufactured by the following steps, for example.

At first, the cathode 21 is formed. After the cathode active material, a binder and an electrical conductor are mixed to form a cathode mixture, the cathode mixture is dispersed in an organic solvent to form paste-form cathode mixture slurry.

Next, the cathode mixture slurry is uniformly applied to both sides of the cathode current collector 21A through the use of a doctor blade, a bar coater or the like, and the cathode mixture slurry is dried. Finally, the cathode mixture slurry is compression molded by a roller press or the like while applying heat, if necessary, thereby the cathode active material layer 21B is formed. In this case, compression molding may be repeated a plurality of times.

Next, the anode active material layer 22B is formed on both sides of the anode current collector 22A by the same steps as the above-described steps of forming the anode so as to form the anode 22.

Next, the cathode 21 and the anode 22 are used to assemble the secondary battery. At first, the cathode lead 24 and the anode lead 25 are attached to the cathode current collector 21A and the anode current collector 22A, respectively, by welding. Next, the cathode 21 and the anode 22 are laminated with the separator 23 in between to form a laminate, and the laminate is spirally wound in a longitudinal direction, and then the laminate is molded into a flat shape to form the battery element 20. Next, after the battery element 20 is contained in the battery can 11, the insulating plate 12 is arranged on the battery element 20. Next, after the cathode lead 24 and the anode lead 25 are connected to the cathode pin 15 and the battery can 11, respectively, by welding, the battery cover 13 is fixed in an open end of the battery can 11 by laser welding. Finally, the electrolytic solution is injected into the battery can 11 through the injection hole 19 so that the separator 23 is impregnated with the electrolytic solution, and then the injection hole 19 is filled with the sealing member 19A. Thereby, the secondary battery shown in FIGS. 8 and 9 is completed.

In the prismatic secondary battery, the anode 22 has the same configuration as that of the above-described anode, so the cycle characteristics may be improved. In this case, in the case where the anode 22 includes silicon which is advantageous to increase a capacity, the cycle characteristics are improved, so a higher effect than that in the case where the anode includes another anode material such as a carbon material may be obtained.

In particular, in the case where the battery can 11 is made of a hard metal, compared to the case where the battery can 11 is made of a soft film, the anode 22 is resistant to damage due to swelling and shrinkage of the anode active material layer 22B. Therefore, the cycle characteristics may be improved. In this case, when the battery can 11 is made of iron which is harder than aluminum, a higher effect may be obtained.

The effects of the secondary battery except for the above-described effects are the same as those of the above-described anode.

Second Battery

Figure 10:
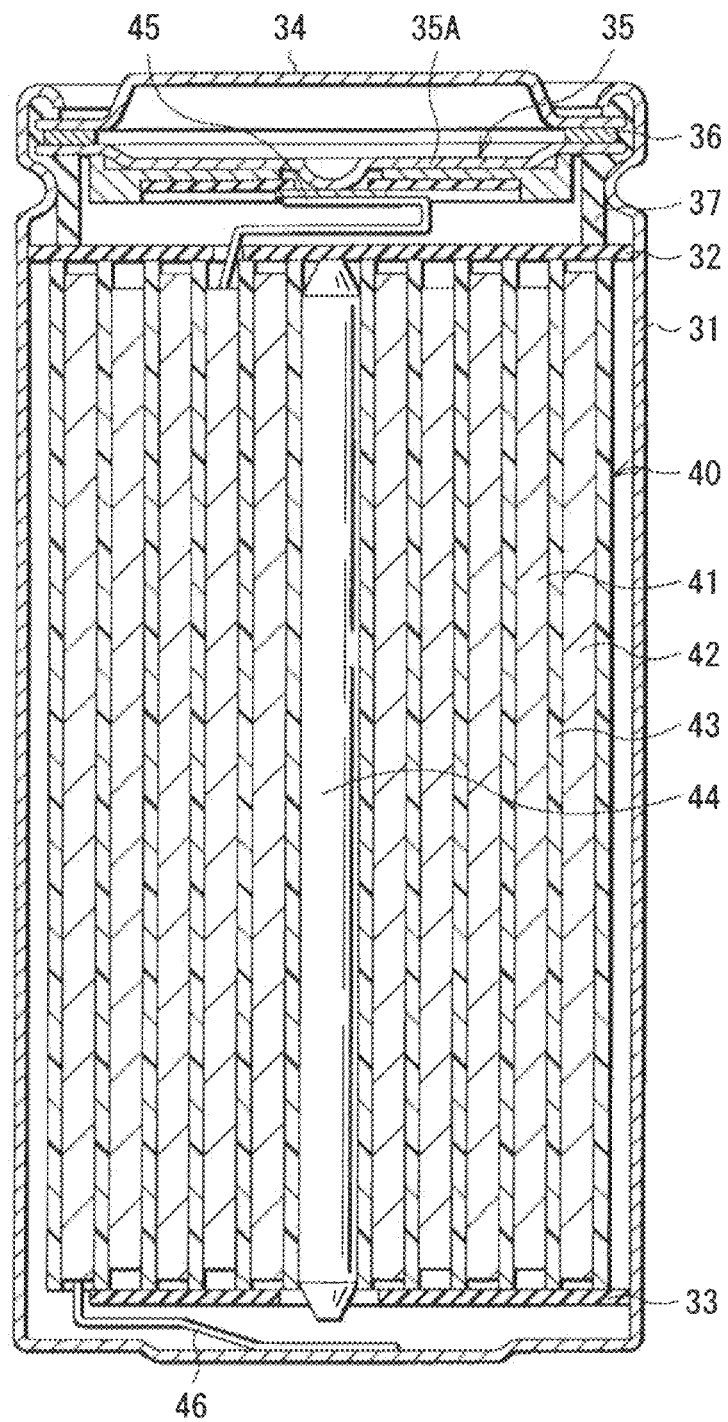
FIG. 10 is a sectional view showing the configuration of a second battery including the anode according to the embodiment of the invention.
Figure 11:
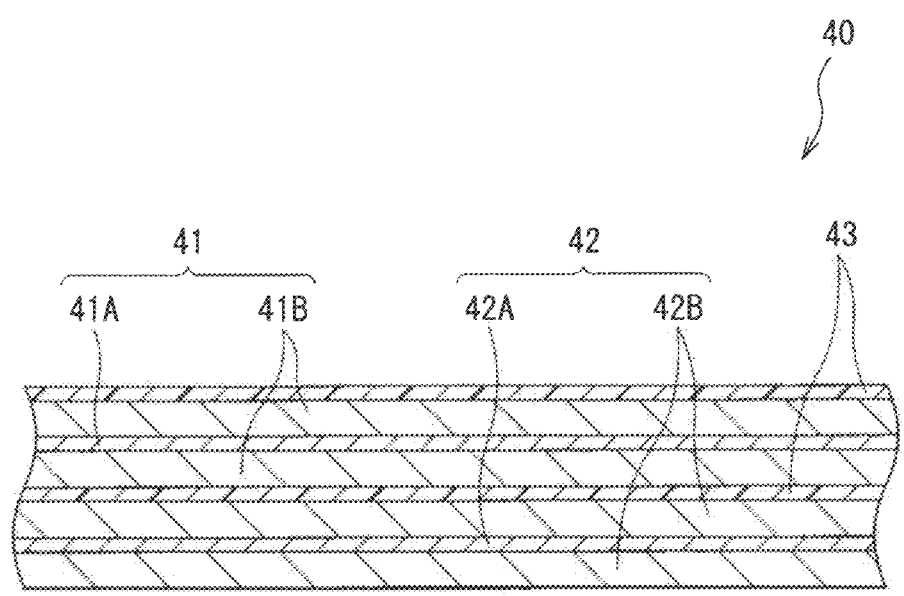
FIG. 11 is an enlarged sectional view showing a part of a spirally wound electrode body shown in FIG. 10.

FIGS. 10 and 11 show sectional views of a second battery, and FIG. 11 shows an enlarged view of a part of a spirally wound electrode body 40 shown in FIG. 10. The secondary battery is a lithium-ion secondary battery as in the case of the first battery, and includes the spirally wound electrode body 40 which includes a cathode 41 and an anode 42 spirally wound with a separator 43 in between, and a pair of insulating plates 32 and 33 in a substantially hollow cylindrical-shaped battery can 31. The battery configuration including the cylindrical battery can 31 is called a so-called cylindrical type.

The battery can 31 is made of, the same material as that of the battery can 11 in the first battery, and an end of the battery can 31 is closed, and the other end thereof is opened. The spirally wound electrode body 40 is sandwiched between the pair of insulating plates 32 and 33, and the pair of insulating plates 32 and 33 are arranged so as to extend in a direction perpendicular to a peripheral winding surface.

In the open end of the battery can 31, a battery cover 34, and a safety valve mechanism 35 and a positive temperature coefficient device (PTC device) 36 arranged inside the battery cover 34 are mounted by caulking by a gasket 37. Thereby, the interior of the battery can 31 is sealed. The battery cover 34 is made of, for example, the same material as that of the battery can 31. The safety valve mechanism 35 is electrically connected to the battery cover 34 through the PTC device 36. In the safety valve mechanism 35, when an internal pressure in the secondary battery increases to a certain extent or higher due to an internal short circuit or external application of heat, a disk plate 35A is flipped so as to disconnect the electrical connection between the battery cover 34 and the spirally wound electrode body 40. When a temperature rises, the PTC device 36 limits a current by an increased resistance to prevent abnormal heat generation caused by a large current. The gasket 37 is made of, for example, an insulating material, and its surface is coated with asphalt.

For example, a center pin 44 may be inserted into the center of the spirally wound electrode body 40. In the spirally wound electrode body 40, a cathode lead 45 made of aluminum or the like is connected to the cathode 41, and an anode lead 46 made of nickel or the like is connected to the anode 42. The cathode lead 45 is welded to the safety valve mechanism 35 so as to be electrically connected to the battery cover 34, and the anode lead 46 is welded and electrically connected to the battery can 31.

The cathode 41 is formed by arranging a cathode active material layer 41B on both sides of a strip-shaped cathode current collector 41A. The anode 42 has the same configuration as that of the above-described anode, and is formed, for example, by arranging an anode active material layer 42B on both sides of a strip-shaped anode current collector 42A. The configurations of the cathode current collector 41A, the cathode active material layer 41B, the anode current collector 42A, the anode active material layer 42B and the separator 43, and the composition of the electrolytic solution are the same as the configurations of the cathode current collector 21A, the cathode active material layer 21B, the anode current collector 22A, the anode active material layer 22B and the separator 23, and the composition of the electrolytic solution in the first battery, respectively.

When the secondary battery is charged, for example, lithium ions are extracted from the cathode 41, and are inserted into the anode 42 through the electrolytic solution. On the other hand, when the secondary battery is discharged, for example, the lithium ions are extracted from the anode 42 and are inserted into the cathode 41 through the electrolytic solution.

The secondary battery may be manufactured by the following steps, for example.

At first, the cathode 41 in which the cathode active material layer 41B is arranged on both sides of the cathode current collector 41A, and the anode 42 in which the anode active material layer 42B is arranged on both sides of the anode current collector 42A are formed by the same steps as the above-described steps of forming the cathode 21 and the anode 22 in the first battery. Next, the cathode lead 45 is welded to the cathode 41, and the anode lead 46 is welded to the anode 42. Then, the cathode 41 and the anode 42 are spirally wound with the separator 43 in between to form the spirally wound electrode body 40, and an end of the cathode lead 45 is welded to the safety valve mechanism 35, and an end of the anode lead 46 is welded to the battery can 31, and then the spirally wound electrode body 40 sandwiched between the pair of insulating plates 32 and 33 is contained in the battery can 31. Next, the electrolytic solution is injected into the battery can 31 so that the separator 43 is impregnated with the electrolytic solution. Finally, the battery cover 34, the safety valve mechanism 35 and the PTC device 36 are fixed in an open end of the battery can 31 by caulking by the gasket 37. Thereby, the secondary battery shown in FIGS. 10 and 11 is completed.

In the cylindrical secondary battery, the anode 42 has the same configuration as that of the above-described anode, so the cycle characteristics may be improved. The effects of the secondary battery except for the above-described effects are the same as those of the first battery.

Third Battery

Figure 12:
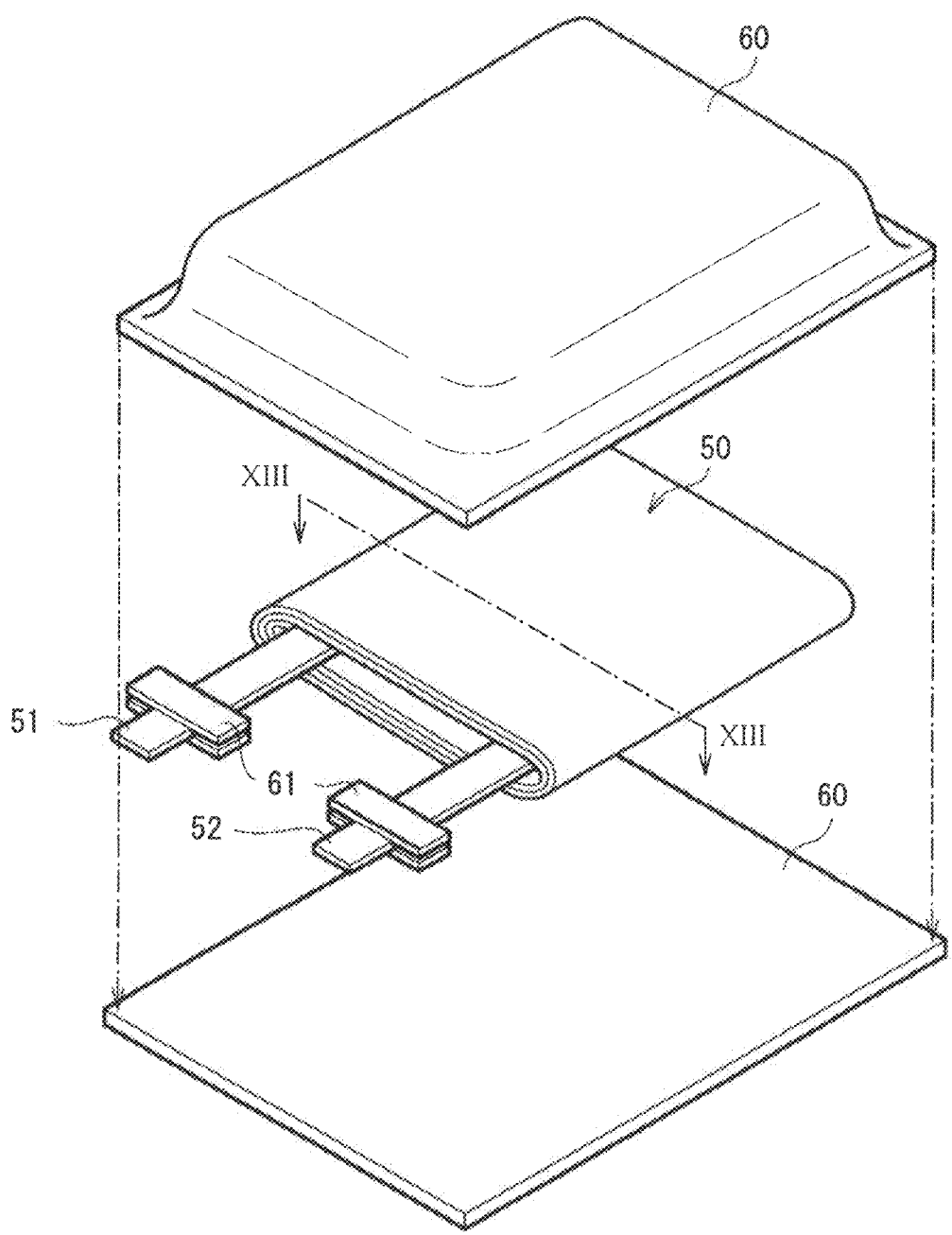
FIG. 12 is a sectional view showing a configuration of a third battery including the anode according to the embodiment of the invention.
Figure 13:
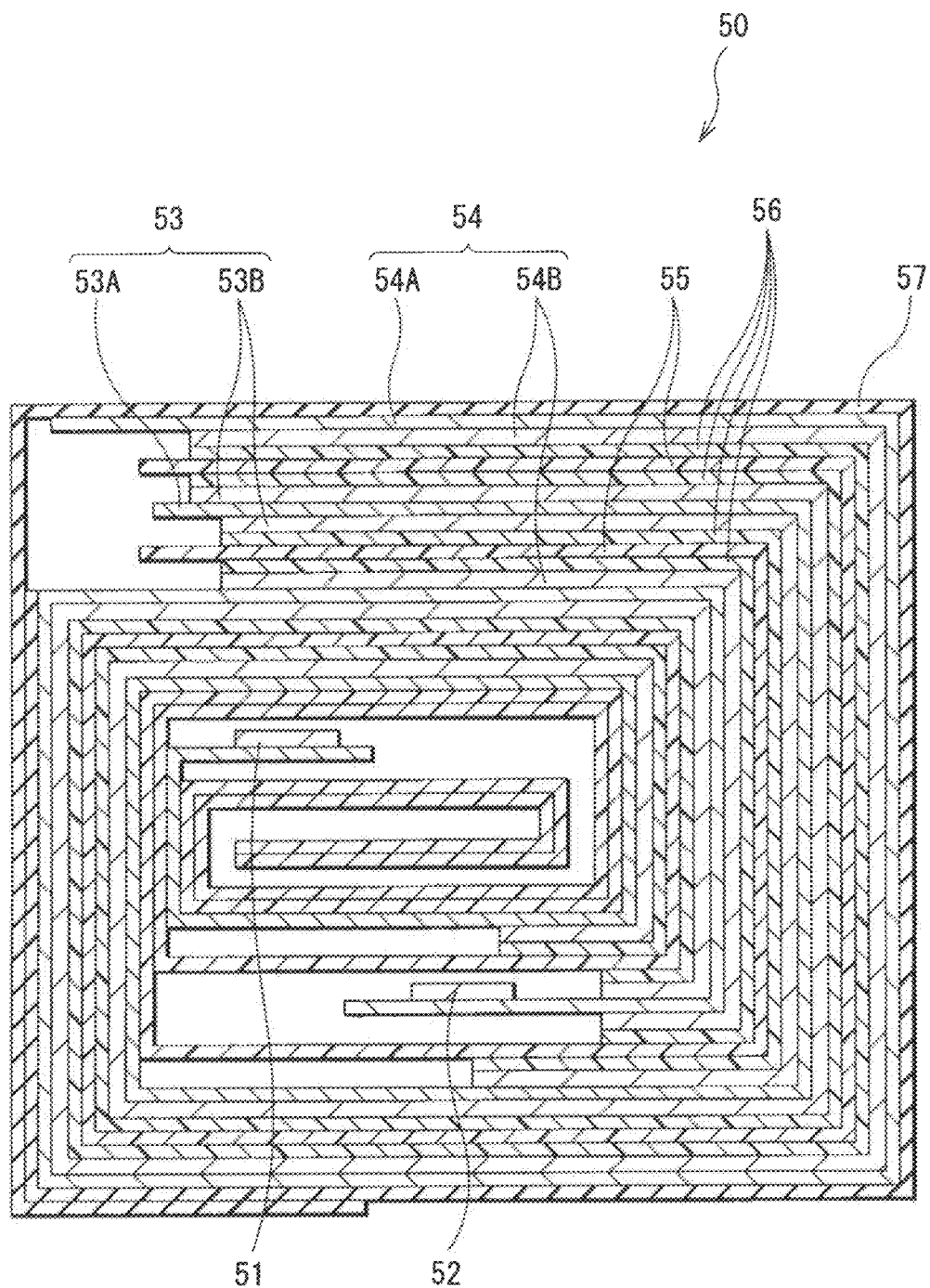
FIG. 13 is a sectional view showing a spirally wound electrode body taken along a line XIII-XIII of FIG. 12.

FIG. 12 shows an exploded perspective view of a third battery, and FIG. 13 shows an enlarged sectional view taken along a line XIII-XIII of FIG. 12. The battery is, for example, a lithium-ion secondary battery as in the case of the above-described first battery, and in the battery, a spirally wound electrode body 50 to which a cathode lead 51 and an anode lead 52 are attached is contained in film-shaped package members 60. The configuration of the battery including the package members 60 is a so-called laminate film type.

The cathode lead 51 and the anode lead 52 are drawn, for example, from the interiors of the package members 60 to outside in the same direction, and each have a sheet shape or a mesh shape. The cathode lead 51 is made of, for example, a metal material such as aluminum, and the anode lead 52 are made of, for example, a metal material such as copper, nickel or stainless.

The package members 60 are made of, for example, an aluminum laminate film including a nylon film, aluminum foil and a polyethylene film which are bonded in this order. The package members 60 are arranged so that the polyethylene film of each of the package members 60 faces the spirally wound electrode body 50, and edge portions of two rectangular aluminum laminate films are adhered to each other by fusion bonding or an adhesive.

An adhesive film 61 is inserted between the package members 60 and the cathode lead 51 and the anode lead 52 for preventing the entry of outside air. The adhesive film 61 is made of, for example, a material having adhesion to the cathode lead 51 and the anode lead 52. Examples of the material of this kind include polyolefin resins such as polyethylene, polypropylene, modified polyethylene and modified polypropylene.

In addition, the package members 60 may be made of a laminate film with any other configuration, a polymer film such as polypropylene or a metal film instead of the above-described aluminum laminate film.

The spirally wound electrode body 50 is formed by laminating a cathode 53 and an anode 54 with a separator 55 and an electrolyte 56 in between, and then spirally winding them, and an outermost portion of the spirally wound electrode body 50 is protected with a protective tape 57.

The cathode 53 is formed by arranging a cathode active material layer 53B on both sides of a strip-shaped cathode current collector 53A. The anode 54 has the same configuration as that of the above-described anode, and the anode 54 is formed by arranging an anode active material layer 54B on both sides of a strip-shaped anode current collector 54A. The configurations of the cathode current collector 53A, the cathode active material layer 53B, the anode current collector 54A, the anode active material layer 54B and the separator 55 are the same as those of the cathode current collector 21A, the cathode active material layer 21B, the anode current collector 22A, the anode active material layer 22B and the separator 23 in the first battery, respectively.

The electrolyte 56 includes an electrolytic solution and a polymer compound holding the electrolytic solution, and is a so-called gel electrolyte. The gel electrolyte is preferable, because the gel electrolyte is capable of obtaining high ionic conductivity (for example, 1 mS/cm or over at room temperature), and liquid leakage is prevented. The electrolyte 56 is arranged, for example, between the cathode 53 and the separator 55 and between the anode 54 and the separator 55.

Examples of the polymer compound include polyacrylonitrile, polyvinylidene fluoride, a copolymer of polyvinylidene fluoride and polyhexafluoropyrene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acids, polymethacrylic acids, styrene-butadiene rubber, nitrile-butadiene rubber, polystyrene, polycarbonate and the like. Only one kind or a mixture of a plurality of kinds selected from them may be used. Among them, polyacrylonitrile, polyvinylidene fluoride, polyhexafluoropropylene or polyethylene oxide is preferable, because they are electrochemically stable.

The composition of the electrolytic solution is the same as the composition of the electrolytic solution in the first battery. However, the solvent in this case means a wide concept including not only a liquid solvent but also a solvent having ionic conductivity capable of dissociating the electrolyte salt. Therefore, in the case where a polymer compound having ionic conductivity is used, the polymer compound is included in the concept of the solvent.

In addition, instead of the gel electrolyte 56 in which the polymer compound holds the electrolytic solution, the electrolytic solution may be used as it is. In this case, the separator 55 is impregnated with the electrolytic solution.

When the secondary battery is charged, for example, lithium ions are extracted from the cathode 53, and are inserted into the anode 54 through the electrolyte 56. On the other hand, when the secondary battery is discharged, lithium ions are extracted from the anode 54, and are inserted into the cathode 53 through the electrolyte 56.

The secondary battery including the gel electrolyte 56 may be manufactured by the following three kinds of manufacturing methods, for example.

In a first manufacturing method, at first, by the same steps as those in the method of manufacturing the first battery, the cathode active material layer 53B is formed on both sides of the cathode current collector 53A so as to form the cathode 53, and the anode active material layer 54B is formed on both sides of the anode current collector 54A so as to form the anode 54. Next, the gel electrolyte 56 is formed by preparing a precursor solution including the electrolytic solution, the polymer compound and a solvent, applying the precursor solution to the cathode 53 and the anode 54, and volatilizing the solvent. Next, the cathode lead 51 and the anode lead 52 are welded to the cathode current collector 53A and the anode current collector 54A, respectively. Next, after the cathode 53 on which the electrolyte 56 is formed and the anode 54 on which the electrolyte 56 is formed are laminated with the separator 55 in between to form a laminate, the laminate is spirally wound in a longitudinal direction, and the protective tape 57 is bonded to an outermost portion of the laminate so as to form the spirally wound electrode body 50. Finally, for example, the spirally wound electrode body 50 is sandwiched between two film-shaped package members 60, and edge portions of the package members 60 are adhered to each other by thermal fusion bonding or the like to seal the spirally wound electrode body 50 in the package members 60. In this case, the adhesive film 61 is inserted between the cathode lead 51 and the anode lead 52, and the package members 60. Thereby, the secondary battery shown in FIGS. 12 and 13 is completed.

In a second manufacturing method, at first, after the cathode lead 51 and the anode lead 52 are welded to the cathode 53 and the anode 54, respectively, the cathode 53 and the anode 54 are laminated with the separator 55 in between to form a laminate, and the laminate is spirally wound, and the protective tape 57 is bonded to an outermost portion of the spirally wound laminate so as to form a spirally wound body as a precursor body of the spirally wound electrode body 50. Next, the spirally wound body is sandwiched between two film-shaped package members 60, and the edge portions of the package members 60 except for edge portions on one side are adhered by thermal fusion bonding or the like to form a pouched package, thereby the spirally wound body is contained in the package members 60. An electrolytic composition which includes the electrolytic solution, monomers as materials of a polymer compound and a polymerization initiator and, if necessary, any other material such as a polymerization inhibitor is prepared, and the composition is injected in the package members 60, and then an opened portion of the package members 60 are sealed by thermal fusion bonding or the like. Finally, the monomers are polymerized by applying heat to form the polymer compound, thereby the gel electrolyte 56 is formed. Thus, the secondary battery is completed.

In a third manufacturing method, as in the case of the first manufacturing method, the spirally wound body is formed, and the spirally wound body is contained in the package members 60, except that the separator 55 with both sides coated with a polymer compound is used. As the polymer compound applied to the separator 55, for example, a polymer including vinylidene fluoride as a component, that is, a homopolymer, a copolymer, a multicomponent copolymer, or the like is cited. More specifically, polyvinylidene fluoride, a binary copolymer including vinylidene fluoride and hexafluoropropylene as components, a ternary copolymer including vinylidene fluoride, hexafluoropropylene and chlorotrifluoroethylene as components is cited. The polymer compound may include one kind or two or more kinds of other polymer compounds in addition to the above-described polymer including vinylidene fluoride as a component. Next, after the electrolytic solution is prepared, and injected into the package members 60, an opened portion of the package members 60 is sealed by thermal fusion bonding or the like. Finally, the package members 60 are heated while being weighted so that the separator 55 is brought into close contact with the cathode 53 and the anode 54 with the polymer compound in between. Thereby, the polymer compound is impregnated with the electrolytic solution, and the polymer compound is gelatinized so as to form the electrolyte 56, so the secondary battery is completed.

In the third manufacturing method, compared to the first manufacturing method, swelling characteristics are improved. Moreover, in the third manufacturing method, compared to the second manufacturing method, monomers as the materials of the polymer compound, the solvent and the like hardly remain in the electrolyte 56, and a step of forming the polymer compound is controlled well, so sufficient adhesion between the cathode 53 and anode 54, and the separator 55 and the electrolyte 56 is obtained.

In the laminate film type secondary battery, the anode 54 has the same configuration as that of the above-described anode, so the cycle characteristics may be improved. The functions and effects of the laminate type secondary battery are the same as those in the first battery.

EXAMPLES

Specific examples of the invention will be described in detail below.

Example 1-1

A laminate film type secondary battery shown in FIGS. 12 and 13 was manufactured by the following steps. At that time, the laminate film type secondary battery was a lithium-ion secondary battery in which the capacity of the anode 54 is represented based on insertion and extraction of lithium.

At first, the cathode 53 was formed. After lithium carbonate ($Li_2CO_3$) and cobalt carbonate ($CoCO_3$) were mixed at a molar ratio of 0.5:1, the mixture was fired in air at 900° C. for 5 hours to obtain a lithium-cobalt complex oxide ($LiCoO_2$). Next, after 91 parts by weight of the lithium-cobalt complex oxide as a cathode active material, 6 parts by weight of graphite as an electrical conductor and 3 parts by weight of polyvinylidene fluoride as a binder were mixed to form a cathode mixture, the cathode mixture was dispersed in N-methyl-2-pyrrolidone to form paste-form cathode mixture slurry. Finally, after the cathode mixture slurry was uniformly applied to both sides of the cathode current collector 53A made of strip-shaped aluminum foil (with a thickness of 12 μm), and was dried, the cathode mixture slurry was compression molded by a roller press to form the cathode active material layer 53B.

Next, the anode 54 was formed. At first, after the anode current collector 54A made of electrolytic copper foil (with a thickness of 18 μm and a ten-point height of roughness profile Rz of 3.5 μm) was prepared, silicon was deposited on both sides of the anode current collector 54A by an electron beam evaporation method, thereby the anode active material in the form of a plurality of particles was formed so as to have a single-layer configuration (with a thickness of 7.5 μm). In the case where the anode material is formed, as a deflection electron beam evaporation source, silicon with a purity of 99% was used, and an argon gas (Ar), a carbon dioxide gas ($CO_2$) or an oxygen gas ($O_2$) was introduced into the chamber. At that time, the amount of the gas introduced was changed within a range from $8.335 \times 10^{-8}$ $m^3/s$ (=5 sccm) to $833.5 \times 10^{-8}$ $m^3/s$ (500 sccm) both inclusive, the silicon deposition rate was changed within a range from 1 nm/s to 100 nm/s both inclusive, the substrate temperature was changed within a range from −40° C. to 80° C. both inclusive, and the movement rate of the anode current collector 54A was changed as necessary, thereby the diameter (hereinafter referred to as "peak diameter") at which the rate of change in the amount of mercury intruded had a peak was 200 nm. After the rate of change in the amount of mercury intruded was measured by a mercury porosimeter of Micromeritics (AutoPore 9500 series), the peak diameter was determined from the measurement result.

After that, silicon oxide ($SiO_2$) was deposited by a liquid-phase deposition method to form an oxide-containing film, thereby the anode active material layer 54B was formed. In the case where the oxide-containing film was formed, after a dissolved species easily coordinating fluorine as an anion trapping agent was added to and mixed with a solution of a fluoride complex of silicon to form a mixture, the anode current collector 54A on which the anode active material was formed was immersed in the mixture, and a fluorine anion generated from the fluoride complex was trapped by the dissolved species, thereby an oxide was deposited on the surface of the anode active material. At that time, the deposition time of the oxide (the amount of the oxide-containing film intruded into small pores) was adjusted so that the volumetric capacity of the small pore group (a pore group with a diameter ranging from 3 nm to 200 nm both inclusive) per unit weight of silicon (hereinafter may be simply referred to as unit volumetric capacity) was 0.1 $cm^3/g$. The unit volumetric capacity was determined by a value (the weight of silicon as the anode active material) determined by subtracting the weights of the anode current collector 54A and the oxide-containing film from the total weight of the anode current collector 54A on which the anode active material and the oxide-containing film were formed, and the value (the volumetric capacity of the small pore group) of the amount of mercury intruded into pores with a diameter ranging from 3 nm to 200 nm both inclusive which was measured by the above-described mercury porosimeter.

Next, the cathode lead 51 made of aluminum was welded to an end of the cathode current collector 53A, and the anode lead 52 made of nickel was welded to an end of the anode current collector 54A. Then, after the cathode 53, a three-layer configuration polymer separator 55 (with a thickness of 23 µm) formed by sandwiching a film made of porous polyethylene as a main component between films made of porous polypropylene as a main component, the anode 54, and the above-described polymer separator 55 were laminated in this order to form a laminate, and the laminate was spirally wound in a longitudinal direction, an outermost portion of the laminate was fixed by the protective tape 57 made of an adhesive tape to form a spirally wound body as a precursor body of the spirally wound electrode body 50. Next, after the spirally wound body was sandwiched between package members 60 made of a laminate film (with a total thickness of 100 µm) with a three-layer configuration formed by laminating nylon (with a thickness of 30 µm), aluminum (with a thickness of 40 µm) and cast polypropylene (with a thickness of 30 µm) in order from outside, the edge portions of the package members 60 except for edge portions on one side were adhered by thermal fusion bonding to form a pouched package, thereby the spirally wound body was contained in the package members 60. Next, the electrolytic solution was injected into the package members 60 from an opened portion of the package members 60, and the separator 55 was impregnated with the electrolytic solution, thereby the spirally wound electrode body 50 was formed. To form the electrolytic solution, ethylene carbonate (EC) and diethyl carbonate (DEC) were mixed to form a mixture as a solvent, and lithium hexafluorophosphate ($LiPF_6$) as the electrolyte salt was dissolved in the solvent. At that time, the composition of the solvent had a weight ratio of EC:DEC=50:50, and the concentration of the electrolyte salt was 1 mol/kg.

Finally, the opened portion of the package members 60 were sealed by thermal fusion bonding in a vacuum atmosphere, thereby the laminate film type secondary battery was completed.

When the amount of mercury intruded or the rate of change in the amount of mercury intruded was measured by a mercury porosimeter, the secondary battery was disassembled in a dry atmosphere after an after-mentioned cycle test, and the anode 54 was taken out, and after the anode 54 was cleaned with propylene carbonate and dimethyl carbonate, and dried in a vacuum, the anode 54 was cut into a size of 25 mm×350 mm to form a measurement sample.

Examples 1-2 to 1-13

Secondary batteries were formed by the same steps as those in Example 1-1, except that the peak diameter was 400 nm (Example 1-2), 700 nm (Example 1-3), 800 nm (Example 1-4), 1000 nm (Example 1-5), 3000 nm (Example 1-6), 5000 nm (Example 1-7), 7000 nm (Example 1-8), 8000 nm (Example 1-9), 9000 nm (Example 1-10), 10000 nm (Example 1-11), 12000 nm (Example 1-12) or 15000 nm (Example 1-13).

Comparative Examples 1-1 to 1-4

Secondary batteries were formed by the same steps as those in Example 1-1, except that the peak diameter was 50 nm (Comparative Example 1-1), 100 nm (Comparative Example 1-2), 17000 nm (Comparative Example 1-3) or 20000 nm (Comparative Example 1-4).

Figure 14:
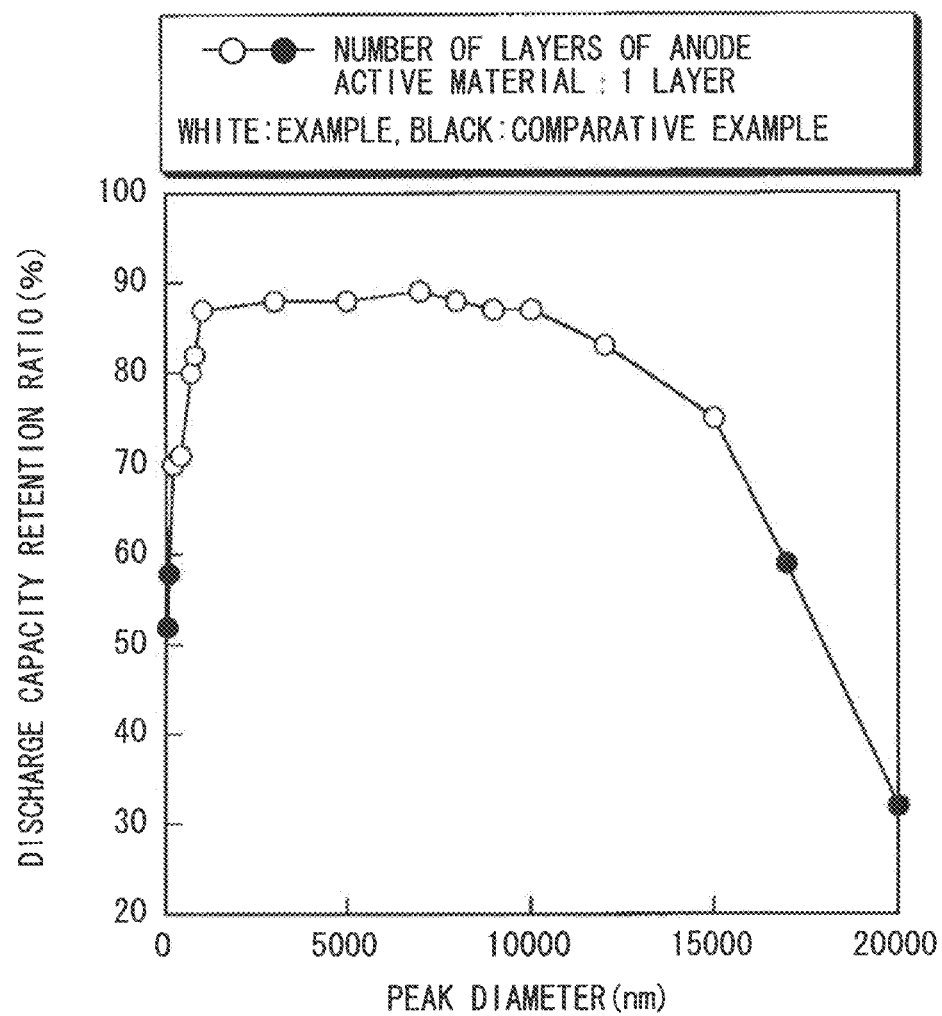
FIG. 14 is a diagram showing a correlation between a peak diameter and a discharge capacity retention ratio (the number of layers of an anode active material: one layer)

When the cycle characteristics of the secondary batteries of Examples 1-1 to 1-13 and Comparative Examples 1-1 to 1-4 were determined, results shown in Table 1 and FIG. 14 were obtained.

To determine the cycle characteristics, a cycle test was performed by the following steps to determine the discharge capacity retention ratio of each of the secondary batteries. At first, to stabilize the battery state of the secondary battery, after one cycle of charge and discharge was performed on the secondary battery in an atmosphere at 23° C., the secondary battery was charged and discharged again to determine the discharge capacity in the second cycle. Next, 99 cycles of charge and discharge were performed on the secondary battery in the same atmosphere to determine the discharge capacity in the 101st cycle. Finally, the discharge capacity retention ratio (%)=(discharge capacity in the 101st cycle/discharge capacity in the second cycle)×100 was determined by calculation. As the conditions of charge and discharge, after the secondary battery was charged at a constant current density of 3 $mA/cm^2$ until the battery voltage reached 4.2 V, and then the secondary battery was further charged at a constant voltage of 4.2 V until the current density reached 0.3 $mA/cm^2$, the secondary battery was discharged at a constant current density of 3 $mA/cm^2$ until the battery voltage reached 2.5 V.

In addition, the same steps and the same conditions as the above-described steps and the above-described conditions were used to determine the cycle characteristics of secondary batteries of the following examples and the following comparative examples.

TABLE 1

Anode active material: silicon (electron beam evaporation)
Ten-point height of roughness profile Rz = 3.5 μm

| | ANODE ACTIVE MATERIAL LAYER NUMBER (LAYER) | OXIDE-CONTAINING FILM KIND | OXIDE-CONTAINING FILM FORMING METHOD | UNIT VOLUMETRIC CAPACITY ($cm^3/g$) | PEAK DIAMETER (nm) | DISCHARGE CAPACITY RETENTION RATIO (%) |
|---|---|---|---|---|---|---|
| EXAMPLE 1-1 | 1 | $SiO_2$ | LIQUID-PHASE DEPOSITION | 0.1 | 200 | 70 |
| EXAMPLE 1-2 | | | | | 400 | 71 |
| EXAMPLE 1-3 | | | | | 700 | 80 |
| EXAMPLE 1-4 | | | | | 800 | 82 |
| EXAMPLE 1-5 | | | | | 1000 | 87 |
| EXAMPLE 1-6 | | | | | 3000 | 88 |
| EXAMPLE 1-7 | | | | | 5000 | 88 |
| EXAMPLE 1-8 | | | | | 7000 | 89 |
| EXAMPLE 1-9 | | | | | 8000 | 88 |
| EXAMPLE 1-10 | | | | | 9000 | 87 |
| EXAMPLE 1-11 | | | | | 10000 | 87 |
| EXAMPLE 1-12 | | | | | 12000 | 83 |
| EXAMPLE 1-13 | | | | | 15000 | 75 |
| COMPARATIVE EXAMPLE 1-1 | 1 | $SiO_2$ | LIQUID-PHASE DEPOSITION | 0.1 | 50 | 52 |
| COMPARATIVE EXAMPLE 1-2 | | | | | 100 | 58 |
| COMPARATIVE EXAMPLE 1-3 | | | | | 17000 | 59 |
| COMPARATIVE EXAMPLE 1-4 | | | | | 20000 | 32 |

As shown in Table 1 and FIG. 14, when the peak diameter was changed, there was a tendency that as the diameter increased, the discharge capacity retention ratio was increased, then decreased. However, in Examples 1-1 to 1-13 in which the peak diameter was within a range from 200 nm to 15000 nm both inclusive, compared to Comparative Examples 1-1 to 1-4 in which the diameter was out of the range, the discharge capacity retention ratio was largely increased to 70% or over. In this case, when the peak diameter was within a range from 700 nm to 12000 nm both inclusive, the discharge capacity retention ratio was further increased to 80% or over, and when the diameter was within a range from 1000 nm to 10000 nm both inclusive, the discharge capacity retention ratio was further increased to the high 80 percent range.

Therefore, it was confirmed that in the secondary battery according to the embodiment of the invention, in the case where the number of layers of the anode active material was 1, when after charge and discharge, the rate of change in the amount of mercury intruded into a plurality of pores which was measured by mercury porosimetry was distributed so as to have a peak in a diameter range from 200 nm to 12000 nm both inclusive, the cycle characteristics were improved, and when the rate of change had a peak in a diameter range from 700 nm to 12000 nm both inclusive, more specifically in a diameter range from 1000 nm to 10000 nm both inclusive, the cycle characteristics were further improved.

Examples 2-1 to 2-13

Secondary batteries were formed by the same steps as those in Examples 1-1 to 1-13, except that the anode active material had a six-layer configuration. In the case where the anode active material was formed, while the anode current collector 54A was moved back and forth relatively to an evaporation source, silicon was deposited successively, and the silicon deposition rate was 10 nm/s.

Comparative Examples 2-1 to 2-4

Secondary batteries were formed by the same steps as those in Comparative Examples 1-1 to 1-4, except that as in the case of Examples 2-1 to 2-13, the anode active material had a six-layer configuration.

Figure 15:
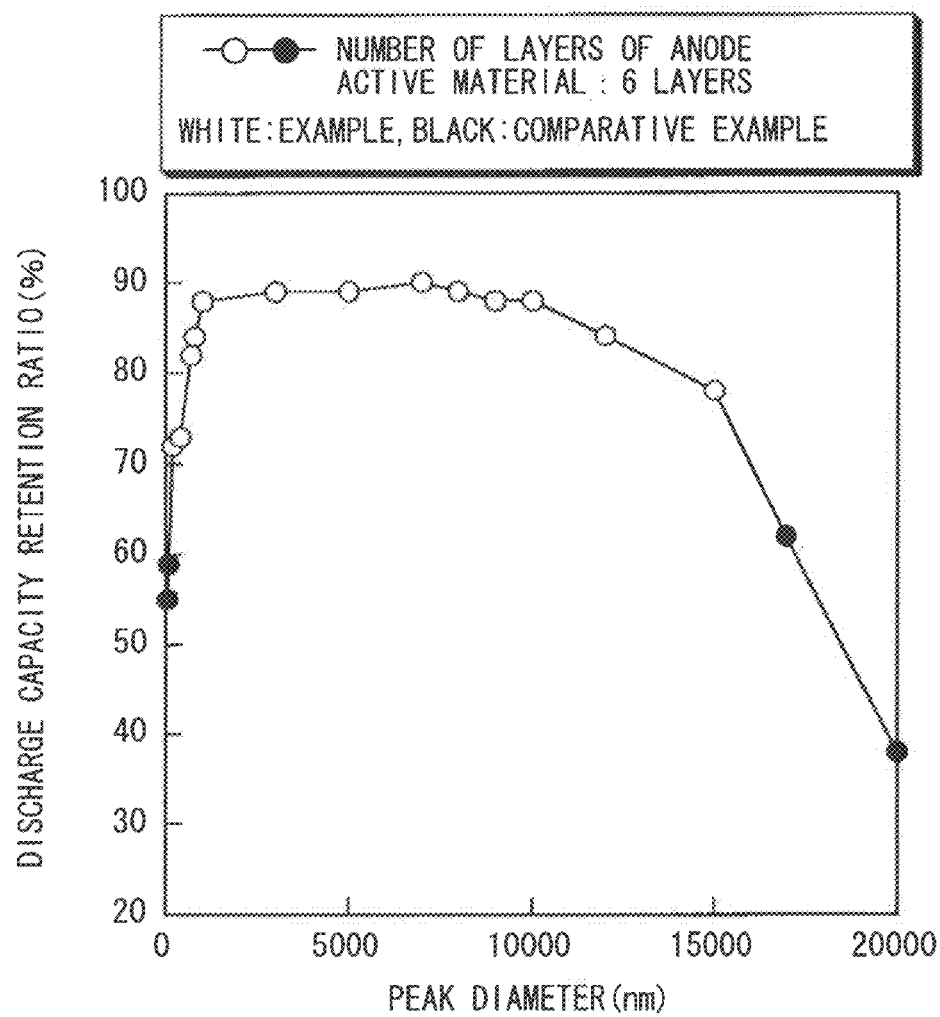
FIG. 15 is a diagram showing a correlation between a peak diameter and a discharge capacity retention ratio (the number of layers of an anode active material: 6 layers)

When the cycle characteristics of the secondary batteries of Examples 2-1 to 2-13 and Comparative Examples 2-1 to 2-4 were determined, results shown in Table 2 and FIG. 15 were obtained.

TABLE 2

Anode active material: silicon (electron beam evaporation)
Ten-point height of roughness profile Rz = 3.5 μm

| | ANODE ACTIVE MATERIAL LAYER NUMBER (LAYER) | OXIDE-CONTAINING FILM KIND | OXIDE-CONTAINING FILM FORMING METHOD | UNIT VOLUMETRIC CAPACITY ($cm^3/g$) | PEAK DIAMETER (nm) | DISCHARGE CAPACITY RETENTION RATIO (%) |
|---|---|---|---|---|---|---|
| EXAMPLE 2-1 | 6 | $SiO_2$ | LIQUID-PHASE DEPOSITION | 0.1 | 200 | 72 |
| EXAMPLE 2-2 | | | | | 400 | 73 |
| EXAMPLE 2-3 | | | | | 700 | 82 |

TABLE 2-continued

Anode active material: silicon (electron beam evaporation)
Ten-point height of roughness profile Rz = 3.5 μm

| | ANODE ACTIVE MATERIAL LAYER NUMBER (LAYER) | OXIDE-CONTAINING FILM KIND | OXIDE-CONTAINING FILM FORMING METHOD | UNIT VOLUMETRIC CAPACITY (cm³/g) | PEAK DIAMTER (nm) | DISCHARGE CAPACITY RETENTION RATIO (%) |
|---|---|---|---|---|---|---|
| EXAMPLE 2-4 | | | | | 800 | 84 |
| EXAMPLE 2-5 | | | | | 1000 | 88 |
| EXAMPLE 2-6 | | | | | 3000 | 89 |
| EXAMPLE 2-7 | | | | | 5000 | 89 |
| EXAMPLE 2-8 | | | | | 7000 | 90 |
| EXAMPLE 2-9 | | | | | 8000 | 89 |
| EXAMPLE 2-10 | | | | | 9000 | 88 |
| EXAMPLE 2-11 | | | | | 10000 | 88 |
| EXAMPLE 2-12 | | | | | 12000 | 84 |
| EXAMPLE 2-13 | | | | | 15000 | 78 |
| COMPARATIVE EXAMPLE 2-1 | 6 | SiO₂ | LIQUID-PHASE DEPOSITION | 0.1 | 50 | 55 |
| COMPARATIVE EXAMPLE 2-2 | | | | | 100 | 59 |
| COMPARATIVE EXAMPLE 2-3 | | | | | 17000 | 62 |
| COMPARATIVE EXAMPLE 2-4 | | | | | 20000 | 38 |

As shown in Table 2 and FIG. 15, even in the case where the anode active material had a six-layer configuration, the same results as those shown in Table 1 were obtained. More specifically, in Examples 2-1 to 2-13 in which the peak diameter was within a range from 200 nm to 15000 nm both inclusive, compared to Comparative Examples 2-1 to 2-4 in which the diameter was out of the range, the discharge capacity retention ratio was largely increased to 70% or over. Therefore, it was confirmed that in the secondary battery according to the embodiment of the invention, even in the case where the number of layers of the anode active material was 6, the cycle characteristics were improved.

Examples 3-1 to 3-13

Secondary batteries were formed by the same steps as those in Examples 1-1 to 1-13, except that the anode active material had a 12-layer configuration.

Comparative Examples 3-1 to 3-4

Secondary batteries were formed by the same steps as those in Comparative Examples 1-1 to 1-4, except that as in the case of Examples 3-1 to 3-13, the anode active material had a 12-layer configuration.

Figure 16:
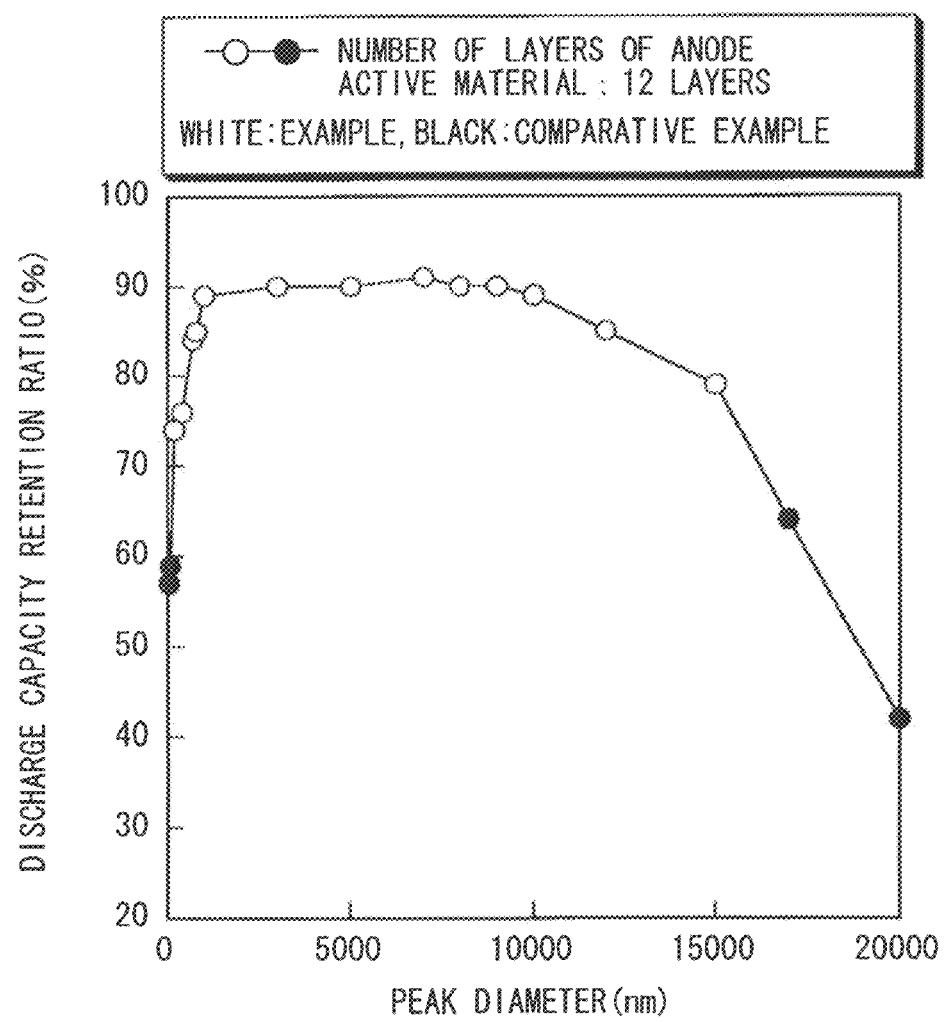
FIG. 16 is a diagram showing a correlation between a peak diameter and a discharge capacity retention ratio (the number of layers of an anode active material: 12 layers)

When the cycle characteristics of the secondary batteries of Examples 3-1 to 3-13 and Comparative Examples 3-1 to 3-4 were determined, results shown in Table 3 and FIG. 16 were obtained.

TABLE 3

Anode active material: silicon (electron beam evaporation)
Ten-point height of roughness profile Rz = 3.5 μm

| | ANODE ACTIVE MATERIAL LAYER NUMBER (LAYER) | OXIDE-CONTAINING FILM KIND | OXIDE-CONTAINING FILM FORMING METHOD | UNIT VOLUMETRIC CAPACITY (cm³/g) | PEAK DIAMTER (nm) | DISCHARGE CAPACITY RETENTION RATIO (%) |
|---|---|---|---|---|---|---|
| EXAMPLE 3-1 | 12 | SiO₂ | LIQUID-PHASE DEPOSITION | 0.1 | 200 | 74 |
| EXAMPLE 3-2 | | | | | 400 | 76 |
| EXAMPLE 3-3 | | | | | 700 | 84 |
| EXAMPLE 3-4 | | | | | 800 | 85 |
| EXAMPLE 3-5 | | | | | 1000 | 89 |
| EXAMPLE 3-6 | | | | | 3000 | 90 |
| EXAMPLE 3-7 | | | | | 5000 | 90 |
| EXAMPLE 3-8 | | | | | 7000 | 91 |
| EXAMPLE 3-9 | | | | | 8000 | 90 |
| EXAMPLE 3-10 | | | | | 9000 | 90 |
| EXAMPLE 3-11 | | | | | 10000 | 89 |
| EXAMPLE 3-12 | | | | | 12000 | 85 |
| EXAMPLE 3-13 | | | | | 15000 | 79 |
| COMPARATIVE EXAMPLE 3-1 | 12 | SiO₂ | LIQUID-PHASE | 0.1 | 50 | 57 |

TABLE 3-continued

Anode active material: silicon (electron beam evaporation)
Ten-point height of roughness profile Rz = 3.5 μm

| | ANODE ACTIVE MATERIAL LAYER NUMBER (LAYER) | OXIDE-CONTAINING FILM KIND | FORMING METHOD | UNIT VOLUMETRIC CAPACITY ($cm^3/g$) | PEAK DIAMTER (nm) | DISCHARGE CAPACITY RETENTION RATIO (%) |
|---|---|---|---|---|---|---|
| COMPARATIVE EXAMPLE 3-2 | | | DEPOSITION | | 100 | 59 |
| COMPARATIVE EXAMPLE 3-3 | | | | | 17000 | 64 |
| COMPARATIVE EXAMPLE 3-4 | | | | | 20000 | 42 |

As shown in Table 3 and FIG. 16, even in the case where the anode active material had a 12-layer configuration, the same results as those shown in Table 1 were obtained. More specifically, in Examples 3-1 to 3-13 in which the peak diameter was within a range from 200 nm to 15000 nm both inclusive, compared to Comparative Examples 3-1 to 3-4 in which the diameter was out of the range, the discharge capacity retention ratio was largely increased to 70% or over. Therefore, it was confirmed that in the secondary battery according to the embodiment of the invention, even in the case where the number of layers of the anode active material was 12, the cycle characteristics were improved.

It was confirmed from the above-described results shown in Tables 1 to 3 and FIGS. 14 to 16 that in the secondary battery according to the embodiment of the invention, when after charge and discharge, the rate of change in the amount of mercury intruded into a plurality of pores which was measured by mercury porosimetry was distributed so as to have a peak in a diameter range from 200 nm to 12000 nm both inclusive, independent of the number of layers of the anode active material, the cycle characteristics were improved. In this case, it was obvious from a comparison among Examples 1-1, 2-1 and 3-1 in which the number of layers of the anode active material were different that when the number of layers of anode active material was increased, the cycle characteristics were further improved.

When various characteristics of some secondary batteries selected from the secondary batteries of the above-described examples and the above-described comparative examples were determined, results shown in FIGS. 17 to 20 were obtained.

Figure 17:
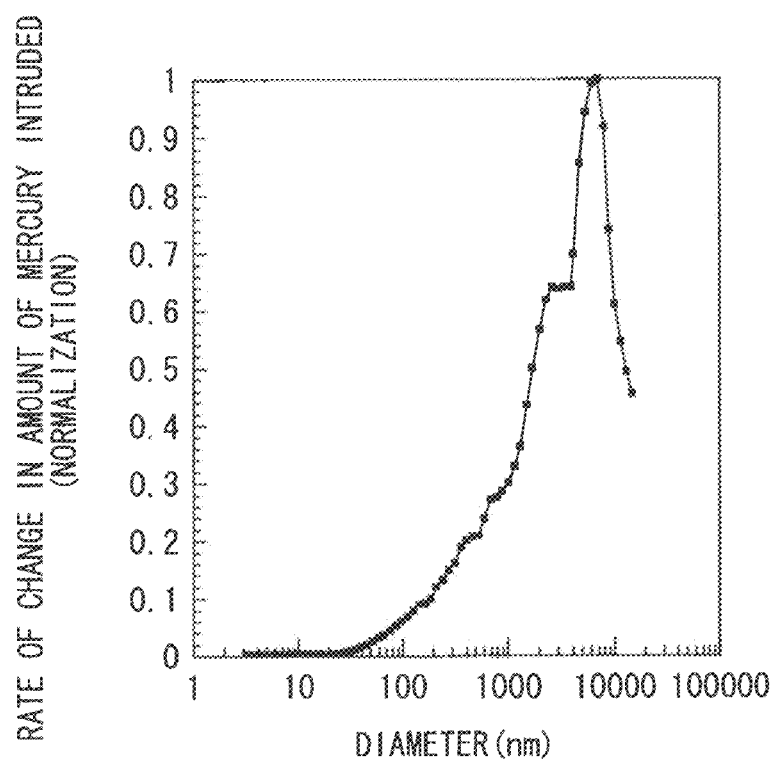
FIG. 17 is a chart showing the distribution of the rate of change in the amount of mercury intruded after charge and discharge (in Example 2-8)
Figure 18:
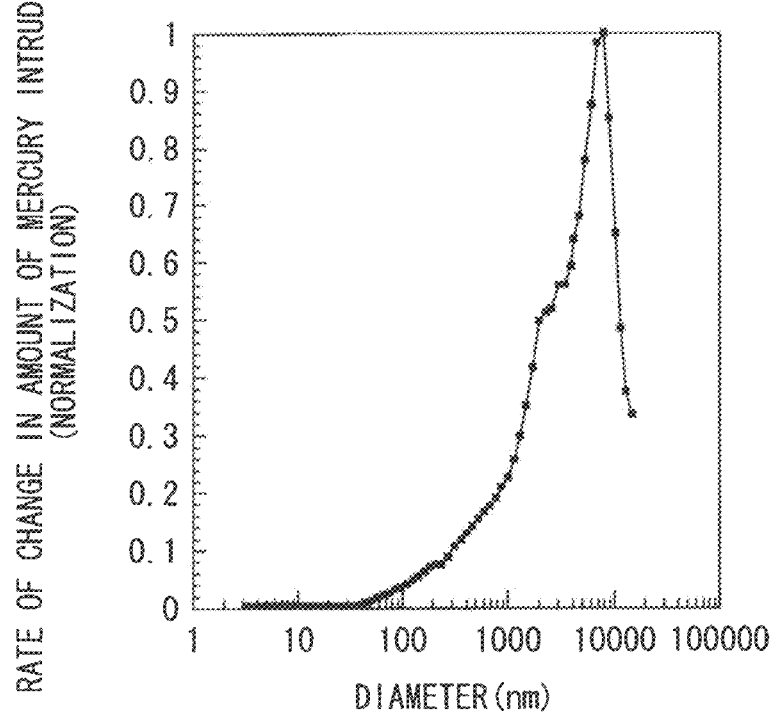
FIG. 18 is a chart showing the distribution of the rate of change in the amount of mercury intruded after charge and discharge (in Example 2-9)

FIGS. 17 and 18 show distributions of the rate of change in the amount of mercury intruded in the secondary batteries of Examples 2-8 and 2-9 after charge and discharge. As shown in FIGS. 17 and 18, in Examples 2-8 and 2-9, after charge and discharge, the rate of change in the amount of mercury intruded had one peak in a diameter range from 200 nm to 15000 nm both inclusive. The peak diameter in this case was 7000 nm in Example 2-8 and 8000 nm in Example 2-9.

Figure 19:
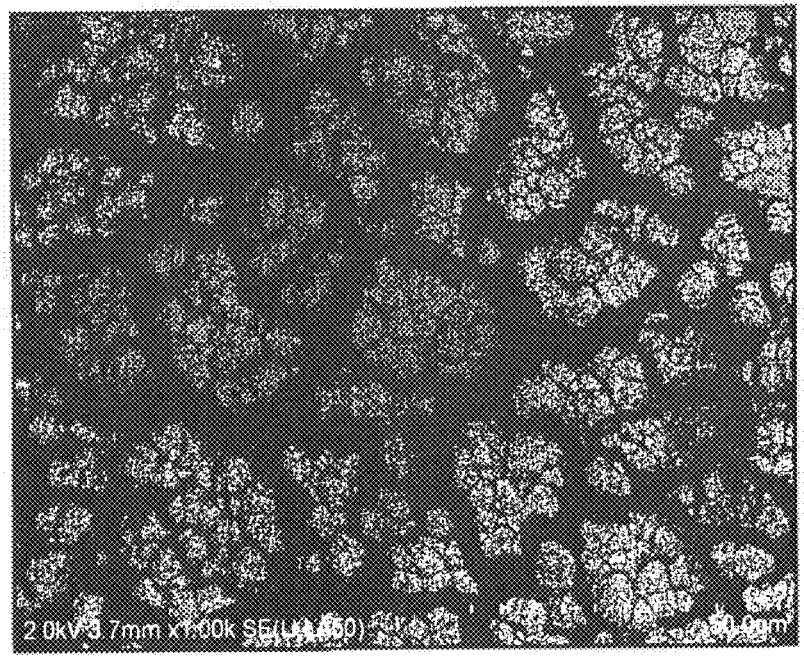
FIG. 19 is an SEM photograph showing the surface configuration of an anode after charge and discharge (in Example 1-7)
Figure 20:
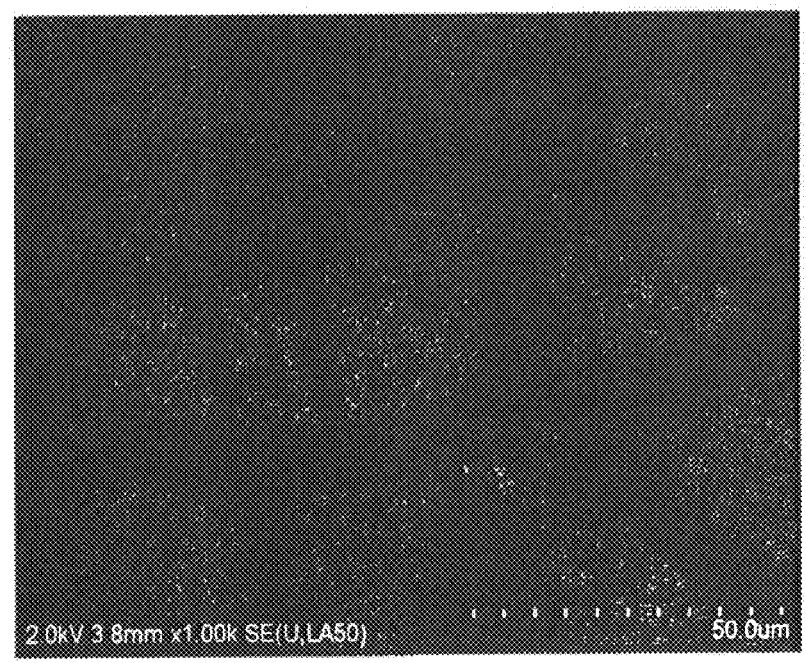
FIG. 20 is an SEM photograph showing the surface configuration of an anode after charge and discharge (in Example 1-8)

Moreover, FIGS. 19 and 20 are SEM photographs showing the surfaces of the anodes 54 in the secondary batteries of Examples 1-7 and 1-8 after charge and discharge. As shown in FIGS. 19 and 20, in Examples 1-7 and 1-8, after charge and discharge, a state in which a plurality of secondary particles separated by grooves were formed was observed. In this case, by a comparison between Examples 1-7 and 1-8, in Example 1-7 in which the peak diameter (the width of the groove) was relatively small, the areas of the secondary particles were reduced, and in Example 1-8 in which the peak diameter was relatively large, the areas of the secondary particles were increased.

Examples 4-1 to 4-7

Secondary batteries were formed by the same steps as those in Examples 2-1, 2-3, 2-5, 2-7 and 2-11 to 2-13, except that the unit volumetric capacity was 0.3 $cm^3/g$.

Comparative Examples 4-1 and 4-2

Secondary batteries were formed by the same steps as those in Comparative Examples 2-2 and 2-3, except that as in the case of Examples 4-1 to 4-7, the unit volumetric capacity was 0.3 $cm^3/g$.

Examples 5-1 to 5-7

Secondary batteries were formed by the same steps as those in Examples 2-1, 2-3, 2-5, 2-7 and 2-11 to 2-13, except that the unit volumetric capacity was 0.05 $cm^3/g$.

Comparative Examples 5-1 and 5-2

Secondary batteries were formed by the same steps as those in Comparative Examples 2-2 and 2-3, except that as in the case of Examples 5-1 to 5-7, the unit volumetric capacity was 0.05 $cm^3/g$.

Examples 6-1 to 6-7

Secondary batteries were formed by the same steps as those in Examples 2-1, 2-3, 2-5, 2-7 and 2-11 to 2-13, except that the volumetric capacity was 0 $cm^3/g$.

Comparative Examples 6-1 and 6-2

Secondary batteries were formed by the same steps as those in Comparative Examples 2-2 and 2-3, except that as in the case of Examples 6-1 to 6-7, the unit volumetric capacity was 0 $cm^3/g$.

Comparative Examples 7-1 to 7-9

Secondary batteries were formed by the same steps as those in Comparative Example 2-2, Examples 2-1, 2-3, 2-5, 2-7 and 2-11 to 2-13, and Comparative Example 2-3, except that the unit volumetric capacity was 0.35 $cm^3/g$.

Figure 21:
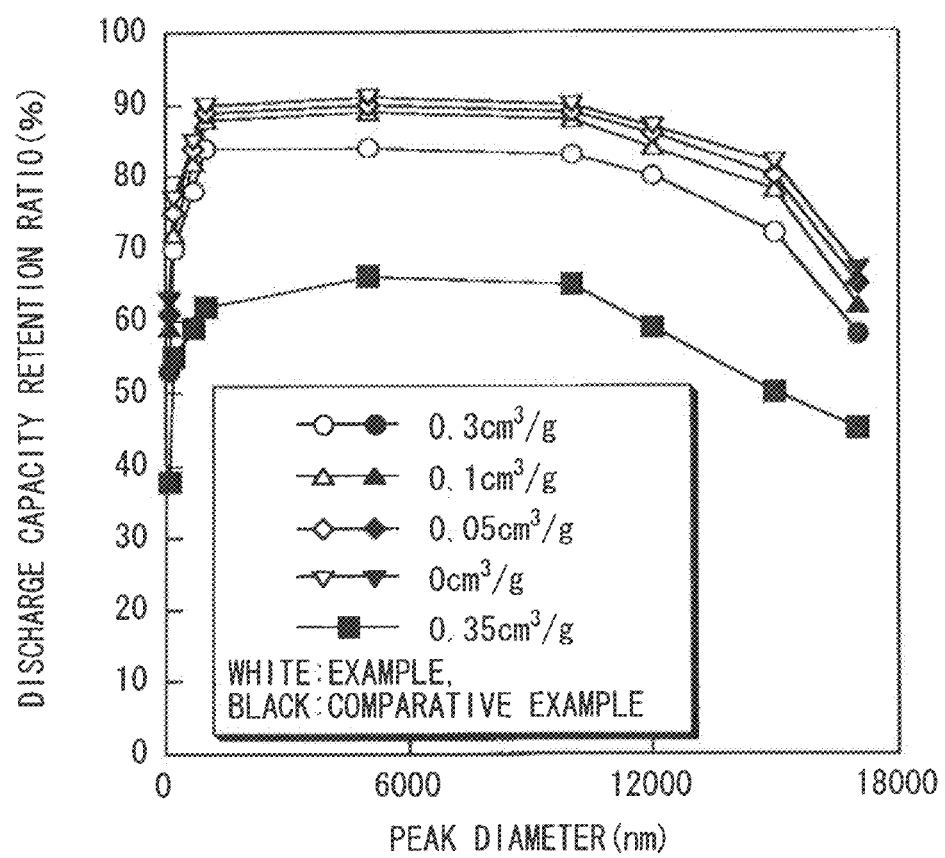
FIG. 21 is a diagram showing a correlation between the volumetric capacity of a small pore group per unit weight of silicon and a peak diameter.

When the cycle characteristics of the secondary batteries of Examples 4-1 to 4-7, 5-1 to 5-7 and 6-1 to 6-7 and Comparative Examples 4-1, 4-2, 5-1, 5-2, 6-1, 6-2 and 7-1 to 7-9 were determined, results shown in Tables 4 to 7 and FIG. 21 were obtained.

TABLE 4

Anode active material: silicon (electron beam evaporation)
Ten-point height of roughness profile Rz = 3.5 μm

| | ANODE ACTIVE MATERIAL LAYER | OXIDE-CONTAINING FILM | | UNIT VOLUMETRIC | PEAK | DISCHARGE CAPACITY RETENTION |
|---|---|---|---|---|---|---|
| | NUMBER (LAYER) | KIND | FORMING METHOD | CAPACITY ($cm^3/g$) | DIAMTER (nm) | RATIO (%) |
| EXAMPLE 4-1 | 6 | $SiO_2$ | LIQUID-PHASE DEPOSITION | 0.3 | 200 | 70 |
| EXAMPLE 4-2 | | | | | 700 | 78 |
| EXAMPLE 4-3 | | | | | 1000 | 84 |
| EXAMPLE 4-4 | | | | | 5000 | 84 |
| EXAMPLE 4-5 | | | | | 10000 | 83 |
| EXAMPLE 4-6 | | | | | 12000 | 80 |
| EXAMPLE 4-7 | | | | | 15000 | 72 |
| COMPARATIVE EXAMPLE 4-1 | 6 | $SiO_2$ | LIQUID-PHASE DEPOSITION | 0.3 | 100 | 53 |
| COMPARATIVE EXAMPLE 4-2 | | | | | 17000 | 58 |

TABLE 5

Anode active material: silicon (electron beam evaporation)
Ten-point height of roughness profile Rz = 3.5 μm

| | ANODE ACTIVE MATERIAL LAYER | OXIDE-CONTAINING FILM | | UNIT VOLUMETRIC | PEAK | DISCHARGE CAPACITY RETENTION |
|---|---|---|---|---|---|---|
| | NUMBER (LAYER) | KIND | FORMING METHOD | CAPACITY ($cm^3/g$) | DIAMTER (nm) | RATIO (%) |
| EXAMPLE 5-1 | 6 | $SiO_2$ | LIQUID-PHASE DEPOSITION | 0.05 | 200 | 75 |
| EXAMPLE 5-2 | | | | | 700 | 84 |
| EXAMPLE 5-3 | | | | | 1000 | 89 |
| EXAMPLE 5-4 | | | | | 5000 | 90 |
| EXAMPLE 5-5 | | | | | 10000 | 89 |
| EXAMPLE 5-6 | | | | | 12000 | 86 |
| EXAMPLE 5-7 | | | | | 15000 | 80 |
| COMPARATIVE EXAMPLE 5-1 | 6 | $SiO_2$ | LIQUID-PHASE DEPOSITION | 0.05 | 100 | 61 |
| COMPARATIVE EXAMPLE 5-2 | | | | | 17000 | 65 |

TABLE 6

Anode active material: silicon (electron beam evaporation)
Ten-point height of roughness profile Rz = 3.5 μm

| | ANODE ACTIVE MATERIAL LAYER | OXIDE-CONTAINING FILM | | UNIT VOLUMETRIC | PEAK | DISCHARGE CAPACITY RETENTION |
|---|---|---|---|---|---|---|
| | NUMBER (LAYER) | KIND | FORMING METHOD | CAPACITY ($cm^3/g$) | DIAMTER (nm) | RATIO (%) |
| EXAMPLE 6-1 | 6 | $SiO_2$ | LIQUID-PHASE DEPOSITION | 0 | 200 | 77 |
| EXAMPLE 6-2 | | | | | 700 | 85 |
| EXAMPLE 6-3 | | | | | 1000 | 90 |
| EXAMPLE 6-4 | | | | | 5000 | 91 |
| EXAMPLE 6-5 | | | | | 10000 | 90 |
| EXAMPLE 6-6 | | | | | 12000 | 87 |
| EXAMPLE 6-7 | | | | | 15000 | 82 |

TABLE 6-continued

Anode active material: silicon (electron beam evaporation)
Ten-point height of roughness profile Rz = 3.5 μm

| | ANODE ACTIVE MATERIAL LAYER NUMBER (LAYER) | OXIDE-CONTAINING FILM KIND | OXIDE-CONTAINING FILM FORMING METHOD | UNIT VOLUMETRIC CAPACITY ($cm^3/g$) | PEAK DIAMTER (nm) | DISCHARGE CAPACITY RETENTION RATIO (%) |
|---|---|---|---|---|---|---|
| COMPARATIVE EXAMPLE 6-1 | 6 | $SiO_2$ | LIQUID-PHASE DEPOSITION | 0 | 100 | 63 |
| COMPARATIVE EXAMPLE 6-2 | | | | | 17000 | 67 |

TABLE 7

Anode active material: silicon (electron beam evaporation)
Ten-point height of roughness profile Rz = 3.5 μm

| | ANODE ACTIVE MATERIAL LAYER NUMBER (LAYER) | OXIDE-CONTAINING FILM KIND | OXIDE-CONTAINING FILM FORMING METHOD | UNIT VOLUMETRIC CAPACITY ($cm^3/g$) | PEAK DIAMTER (nm) | DISCHARGE CAPACITY RETENTION RATIO (%) |
|---|---|---|---|---|---|---|
| COMPARATIVE EXAMPLE 7-1 | 6 | $SiO_2$ | LIQUID-PHASE DEPOSITION | 0.35 | 100 | 38 |
| COMPARATIVE EXAMPLE 7-2 | | | | | 200 | 55 |
| COMPARATIVE EXAMPLE 7-3 | | | | | 700 | 59 |
| COMPARATIVE EXAMPLE 7-4 | | | | | 1000 | 62 |
| COMPARATIVE EXAMPLE 7-5 | | | | | 5000 | 66 |
| COMPARATIVE EXAMPLE 7-6 | | | | | 10000 | 65 |
| COMPARATIVE EXAMPLE 7-7 | | | | | 12000 | 59 |
| COMPARATIVE EXAMPLE 7-8 | | | | | 15000 | 50 |
| COMPARATIVE EXAMPLE 7-9 | | | | | 17000 | 45 |

As shown in Tables 4 to 7 and FIG. 21, when the unit volumetric capacity was changed, there was a tendency that as the unit volumetric capacity decreased, the discharge capacity retention ratio was increased. However, in Examples 4-1 to 4-7, 5-1 to 5-7 and 6-1 and 6-7 and Comparative Examples 4-1, 4-2, 5-1, 5-2, 6-1 and 6-2 in which the unit volumetric capacity was 0.3 $cm^3/g$ or less, compared to Comparative Examples 7-1 to 7-9 in which the unit volumetric capacity was out of the range, the discharge capacity retention ratio was largely increased, and in Examples 4-1 to 4-7, 5-1 to 5-7, and 6-1 to 6-7 in which the peak diameter was within a range from 200 nm to 15000 nm both inclusive, compared to Comparative Examples 4-1, 4-2, 5-1, 5-2, 6-1 and 6-2 in which the peak diameter was out of the range, the discharge capacity retention ratio was largely increased to 70% or over. In this case, when the unit volumetric capacity was 0.1 $cm^3/g$ or less, the discharge capacity retention ratio was further increased, and when the unit volumetric capacity was 0 $cm^3/g$, the discharge capacity retention ratio was at maximum.

Therefore, it was confirmed that in the secondary battery according to the embodiment of the invention, after charge and discharge, when the volumetric capacity of a pore group with a diameter ranging from 3 nm to 200 nm both inclusive per unit weight of silicon was 0.3 $cm^3/g$ or less, the cycle characteristics were improved, and when the volumetric capacity was 0.1 $cm^3/g$ or less, more specifically 0 $cm^3/g$, the cycle characteristics were further improved.

It was confirmed from the above-described results shown in Tables 1 to 7 and FIGS. 14 to 21 that in the secondary battery according to the embodiment of the invention, after charge and discharge, when the volumetric capacity of a pore group with a diameter ranging from 3 nm to 200 nm both inclusive per unit weight of silicon was 0.3 $cm^3/g$ or less, and the rate of change in the amount of mercury intruded into a plurality of pores which was measured by mercury porosimetry was distributed so as to have a peak in a diameter range from 200 nm to 12000 nm both inclusive, the cycle characteristics were improved.

Examples 8-1 to 8-3

Secondary batteries were formed by the same steps as those in Examples 4-4, 2-7 and 6-4, except that a solution of a fluoride complex of germanium was used, and as the oxide-containing film, germanium oxide ($GeO_2$) was formed.

Comparative Example 8

A secondary battery was formed by the same steps as those in Comparative Example 7-5, except that as in the case of Examples 8-1 to 8-3, germanium oxide was formed as the oxide-containing film.

Examples 9-1 to 9-3

Secondary batteries were formed by the same steps as those in Examples 4-4, 2-7 and 6-4, except that a solution of a fluoride complex of tin was used, and as the oxide-containing film, tin oxide ($SnO_2$) was formed.

Comparative Example 9

A secondary battery was formed by the same steps as those in Comparative Example 7-5, except that as in the case of Examples 9-1 to 9-3, as the oxide-containing film, tin oxide was formed.

When the cycle characteristics of the secondary batteries of Examples 8-1 to 8-3 and 9-1 to 9-3 and Comparative Examples 8 and 9 were determined, results shown in Tables 8 and 9 were obtained.

specifically, in Examples 8-1 to 8-3 and 9-1 to 9-3 in which the unit volumetric capacity was 0.3 $cm^3/g$ or less, and the peak diameter was within a range from 200 nm to 15000 nm both inclusive, compared to Comparative Examples 8 and 9 in which the peak diameter was within the range, but the unit volumetric capacity was out of the range, the discharge capacity retention ratio was largely increased to 70% or over. In this case, it was obvious from a comparison among Examples 4-4, 8-1 and 9-1 in which only the kind of the oxide-containing film was different that in the case where silicon oxide was used, the discharge capacity retention ratio tended to be higher. Therefore, it was confirmed that in the secondary battery according to the embodiment of the invention, even in the case where the kind of the oxide-containing film was changed, the cycle characteristics were improved, and when silicon oxide was used, the cycle characteristics were further improved.

Examples 10-1 to 10-3

Secondary batteries were formed by the same steps as those in Example 2-7, except that as the method of forming the oxide-containing film, a sol-gel method (Example 10-1), a coating method (Example 10-2) or an immersion method (Example 10-3) was used.

TABLE 8

Anode active material: silicon (electron beam evaporation)
Ten-point height of roughness profile Rz = 3.5 μm

| | ANODE ACTIVE MATERIAL LAYER NUMBER (LAYER) | OXIDE-CONTAINING FILM KIND | OXIDE-CONTAINING FILM FORMING METHOD | UNIT VOLUMETRIC CAPACITY ($cm^3/g$) | PEAK DIAMTER (nm) | DISCHARGE CAPACITY RETENTION RATIO (%) |
|---|---|---|---|---|---|---|
| EXAMPLE 8-1 | 6 | $GeO_2$ | LIQUID-PHASE DEPOSITION | 0.3 | 5000 | 82 |
| EXAMPLE 8-2 | | | | 0.1 | | 87 |
| EXAMPLE 8-3 | | | | 0 | | 89 |
| COMPARATIVE EXAMPLE 8 | 6 | $GeO_2$ | LIQUID-PHASE DEPOSITION | 0.35 | 5000 | 64 |

TABLE 9

Anode active material: silicon (electron beam evaporation)
Ten-point height of roughness profile Rz = 3.5 μm

| | ANODE ACTIVE MATERIAL LAYER NUMBER (LAYER) | OXIDE-CONTAINING FILM KIND | OXIDE-CONTAINING FILM FORMING METHOD | UNIT VOLUMETRIC CAPACITY ($cm^3/g$) | PEAK DIAMTER (nm) | DISCHARGE CAPACITY RETENTION RATIO (%) |
|---|---|---|---|---|---|---|
| EXAMPLE 9-1 | 6 | $SnO_2$ | LIQUID-PHASE DEPOSITION | 0.3 | 5000 | 80 |
| EXAMPLE 9-2 | | | | 0.1 | | 85 |
| EXAMPLE 9-3 | | | | 0 | | 86 |
| COMPARATIVE EXAMPLE 9 | 6 | $SnO_2$ | LIQUID-PHASE DEPOSITION | 0.35 | 5000 | 62 |

As shown in Tables 8 and 9, in Examples 8-1 to 8-3 and 9-1 to 9-3 in which as the oxide-containing film, germanium oxide or tin oxide was formed, the same results as those in the case where silicon oxide was formed were obtained. More When the cycle characteristics of the secondary batteries of Examples 10-1 to 10-3 were determined, results shown in Table 10 were obtained. In Table 10, the result of Example 2-7 is also shown.

TABLE 10

Anode active material: silicon (electron beam evaporation)
Ten-point height of roughness profile Rz = 3.5 μm

| | ANODE ACTIVE MATERIAL LAYER NUMBER (LAYER) | OXIDE-CONTAINING FILM KIND | FORMING METHOD | UNIT VOLUMETRIC CAPACITY (cm³/g) | PEAK DIAMTER (nm) | DISCHARGE CAPACITY RETENTION RATIO (%) |
|---|---|---|---|---|---|---|
| EXAMPLE 2-7 | 6 | SiO₂ | LIQUID-PHASE DEPOSITION | 0.1 | 5000 | 89 |
| EXAMPLE 10-1 | | | SOL-GEL | | | 86 |
| EXAMPLE 10-2 | | | COATING | | | 87 |
| EXAMPLE 10-3 | | | IMMERSION | | | 85 |

As shown in Table 10, in Examples 10-1 to 10-3 in which the oxide-containing film was formed by a sol-gel method or the like, as in the case of Example 2-7 in which the oxide-containing film was formed by a liquid-phase deposition method, the discharge capacity retention ratio was increased to 70% or over. In this case, in the case where the liquid-phase deposition method was used, the discharge capacity retention ratio tended to be higher. Therefore, it was confirmed that in the secondary battery according to the embodiment of the invention, even in the case where the method of forming the oxide-containing film was changed, the cycle characteristics were improved, and when the liquid-phase deposition method was used, the cycle characteristics were further improved.

Examples 11-1 to 11-3

Secondary batteries were formed by the same steps as those in Examples 2-5, 2-7 and 2-11, except that instead of the oxide-containing film, a metal material not alloyed with lithium was formed. In the case where the metal material was formed, cobalt was deposited on both sides of the anode current collector 54A by an electrolytic plating method. At that time, a cobalt plating solution of Japan Pure Chemical Co., Ltd. was used as a plating solution, and the current density was 2 A/dm² to 5 A/dm², the plating rate was 10 nm/s, and the plating time was adjusted so that the unit volumetric capacity was 0.1 cm³/g.

Examples 11-4 to 11-7

Secondary batteries were formed by the same steps as those in Example 11-2, except that a nickel plating solution (Example 11-4), an iron plating solution (Example 11-5), a zinc plating solution (Example 11-6) or a copper plating solution (Example 11-7) was used, as the metal material, nickel, iron, zinc or copper was deposited. At that time, the current density was 2 A/dm² to 10 A/dm² in the case where the nickel plating solution was used, 2 A/dm² to 5 A/dm² in the case where the iron plating was used, 1 A/dm² to 3 A/dm² in the case where the zinc plating solution was used, and 2 A/dm² to 8 A/dm² in the case where the copper plating solution was used. The above-described plating solutions were made of Japan Pure Chemical Co., Ltd.

When the cycle characteristics of the secondary batteries of Examples 11-1 to 11-7 were determined, results shown in Table 11 were obtained.

TABLE 11

Anode active material: silicon (electron beam evaporation)
Ten-point height of roughness profile Rz = 3.5 μm

| | ANODE ACTIVE MATERIAL LAYER NUMBER (LAYER) | METAL MATERIAL KIND | FORMING METHOD | UNIT VOLUMETRIC CAPACITY (cm³/g) | PEAK DIAMTER (nm) | DISCHARGE CAPACITY RETENTION RATIO (%) |
|---|---|---|---|---|---|---|
| EXAMPLE 11-1 | 6 | Co | ELECTROLYTIC PLATING | 0.1 | 1000 | 87 |
| EXAMPLE 11-2 | | | | | 5000 | 88 |
| EXAMPLE 11-3 | | | | | 10000 | 86 |
| EXAMPLE 11-4 | 6 | Ni | ELECTROLYTIC PLATING | 0.1 | 5000 | 87 |
| EXAMPLE 11-5 | | Fe | | | | 87 |
| EXAMPLE 11-6 | | Zn | | | | 86 |
| EXAMPLE 11-7 | | Cu | | | | 86 |

As shown in Table 11, in Examples 11-1 to 11-7 in which the metal material not alloyed with lithium was formed, as in the case where the oxide-containing film was formed, the discharge capacity retention ratio was increased to 70% or over. In this case, it was obvious from a comparison among Examples 11-2 and 11-4 to 11-7 in which only the kind of the metal material was different that in the case where cobalt was used, the discharge capacity retention ratio tended to be higher. Therefore, it was confirmed that in the secondary battery according to the embodiment of the invention, even in the case where the metal material not alloyed with lithium was formed, the cycle characteristics were improved, and when cobalt was used, a higher effect was obtained.

Examples 12-1 to 12-3

Secondary batteries were formed by the same steps as those in Examples 2-5, 2-7 and 2-11, except that instead of the oxide-containing film, a fluorine resin was formed. In the case where the fluorine resin was formed, after a solution with 0.1 wt % to 5 wt % both inclusive formed by dissolving perfluoropolyether (PFPE) represented by Chemical Formula 1 in a Galden solvent was prepared, PFPE was deposited on both sides of the anode current collector 54A by an immersion method using the solution. At that time, the immersion time was adjusted so that the unit volumetric capacity was 0.1 $cm^3/g$.

When the cycle characteristics of the secondary batteries of Examples 11-1 to 11-3 were determined, results shown in Table 12 were obtained.

fluorine resin was formed as the imbedding material, after charge and discharge, the volumetric capacity of a pore group with a diameter ranging from 3 nm to 200 nm both inclusive per unit weight of silicon was 0.3 $cm^3/g$ or less, and the cycle characteristics were improved. In this case, it was obvious from a comparison among Examples 2-7, 11-2 and 12-2 in which only the kind of the imbedding material was different that when the oxide-containing film was used, the cycle characteristics were further improved.

Examples 13-1 to 13-6

Secondary batteries were formed by the same steps as those in Example 2-8, except that silicon with a purity of 99% and a metal element with a purity of 99.9% were used as evaporation sources to form the anode active material including the silicon element and the metal element. At that time, as

TABLE 12

Anode active material: silicon (electron beam evaporation)
Ten-point height of roughness profile Rz = 3.5 μm

| | ANODE ACTIVE MATERIAL LAYER | FLUORINE RESIN | | UNIT VOLUMETRIC | PEAK | DISCHARGE CAPACITY RETENTION |
|---|---|---|---|---|---|---|
| | NUMBER (LAYER) | KIND | FORMING METHOD | CAPACITY ($cm^3/g$) | DIAMTER (nm) | RATIO (%) |
| EXAMPLE 12-1 | 6 | PFPE (CHEMICAL FORMULA 1) | IMMRESION | 0.1 | 1000 | 86 |
| EXAMPLE 12-2 | | | | | 5000 | 88 |
| EXAMPLE 12-3 | | | | | 10000 | 87 |

As shown in Table 12, in Examples 12-1 to 12-3 in which the fluorine resin was formed, as in the case of the oxide-containing film was formed, the discharge capacity retention ratio was increased to 70% or over. Therefore, it was confirmed that in the secondary battery according to the embodiment, even in the case where the fluorine resin was formed, the cycle characteristics were improved.

It was confirmed from the above-described results shown in Tables 2, 11 and 12 that in the secondary battery according to the embodiment of the invention, when the oxide-containing film, the metal material not alloyed with lithium or the the metal element, iron (Example 13-1), nickel (Example 13-2), molybdenum (Example 13-3), titanium (Example 13-4), chromium (Example 13-5) or cobalt (Example 13-6) was used, and the amount of each metal element evaporated was adjusted so that the content of the metal element in the anode active material was 5 at %.

When the cycle characteristics of the secondary battery of Examples 13-1 to 13-6 were determined, results shown in Table 13 were obtained. In Table 13, the result of Example 2-8 is also shown.

TABLE 13

Anode active material: silicon (electron beam evaporation)
Ten-point height of roughness profile Rz = 3.5 μm
Content of metal element in anode active material = 5 at %

| | ANODE ACTIVE MATERIAL LAYER | | OXIDE-CONTAINING FILM | | UNIT VOLUMETRIC | PEAK | DISCHARGE CAPACITY |
|---|---|---|---|---|---|---|---|
| | NUMBER (LAYER) | METAL ELEMENT | KIND | FORMING METHOD | CAPACITY ($cm^3/g$) | DIAMTER (nm) | RETENTION RATIO (%) |
| EXAMPLE 2-8 | 6 | — | $SiO_2$ | LIQUID-PHASE DEPOSITION | 0.1 | 7000 | 90 |
| EXAMPLE 13-1 | | Fe | | | | | 92 |
| EXAMPLE 13-2 | | Ni | | | | | 91 |
| EXAMPLE 13-3 | | Mo | | | | | 91.5 |
| EXAMPLE 13-4 | | Ti | | | | | 92 |
| EXAMPLE 13-5 | | Cr | | | | | 91.6 |
| EXAMPLE 13-6 | | Co | | | | | 92 |

As shown in Table 13, in Examples 13-1 to 13-6 in which the anode active material included the metal element, as in the case of Example 2-8 in which the metal element was not included, the discharge capacity retention ratio was increased to 70% or over. In this case, in the case where the metal element was included, the discharge capacity retention ratio tended to be higher. Therefore, it was confirmed that in the secondary battery according to the embodiment of the invention, even in the case where the anode active material included the metal element, the cycle characteristics were improved, and when the metal element was included, the cycle characteristics were further improved.

Examples 14-1 to 14-3

Secondary batteries were formed by the same steps as those in Example 2-8, except that silicon was deposited while intermittently introducing an oxygen gas and, if necessary, water vapor into a chamber, thereby the anode active material was formed so that a first oxygen-containing region and a second oxygen-containing region with a higher oxygen content than that in the first oxygen-containing region were alternately laminated. At that time, the oxygen content in the second oxygen-containing region was 3 at %, and the number of the second oxygen-containing regions was 2 (Example 14-1), 4 (Example 14-2) or 6 (Example 14-3).

Figure 22:
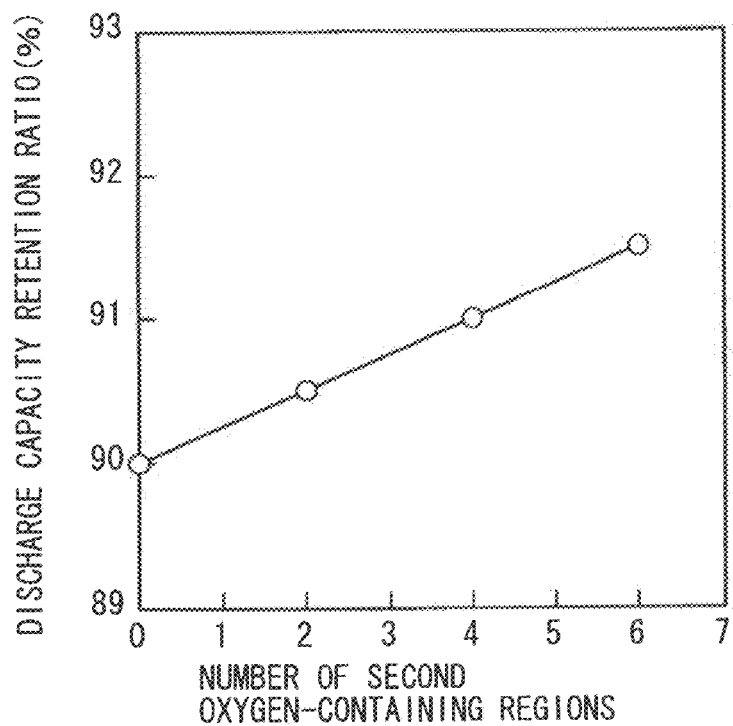
FIG. 22 is a diagram showing a correlation between the number of second oxygen-containing regions and a discharge capacity retention ratio.

When the cycle characteristics of the secondary batteries of Examples 14-1 to 14-3 were determined, results shown in Table 14 and FIG. 22 were obtained. In Table 14, the result of Example 2-8 is also shown.

gen-containing regions, as in the case where they were not included, the discharge capacity retention ratio was increased to 70% or over. In this case, there was a tendency that the larger the number of the second oxygen-containing regions was, the higher the discharge capacity retention ratio became. Therefore, it was confirmed that in the secondary battery according to the embodiment of the invention, even in the case where the anode active material included the first and second oxygen-containing regions, the cycle characteristics were improved, and when the number of the second oxygen-containing regions increased, the cycle characteristics were further improved.

Examples 15-1 to 15-7

Secondary batteries were formed by the same steps as those in Example 2-8, except that the ten-point height of roughness profile Rz of the surface of the anode current collector 54A was 1 μm (Example 15-1), 1.5 μm (Example 15-2), 2.5 μm (Example 15-3), 4.5 μm (Example 15-4), 5.5 μm (Example 15-5), 6.5 μm (Example 15-6) or 7 μm (Example 15-7).

When the cycle characteristics of the secondary batteries of Examples 15-1 to 15-7 were determined, results shown in

TABLE 14

Anode active material: silicon (electron beam evaporation)
Ten-point height of roughness profile Rz = 3.5 μm

| | ANODE ACTIVE MATERIAL LAYER NUMBER (LAYER) | NUMBER OF SECOND OXYGEN-CONTAINING REGION | OXIDE-CONTAINING FILM KIND | OXIDE-CONTAINING FILM FORMING METHOD | UNIT VOLUMETRIC CAPACITY (cm$^3$/g) | PEAK DIAMTER (nm) | DISCHARGE CAPACITY RETENTION RATIO (%) |
|---|---|---|---|---|---|---|---|
| EXAMPLE 2-8 | 6 | — | SiO$_2$ | LIQUID-PHASE DEPOSITION | 0.1 | 7000 | 90 |
| EXAMPLE 14-1 | | 2 | | | | | 90.5 |
| EXAMPLE 14-2 | | 4 | | | | | 91 |
| EXAMPLE 14-3 | | 6 | | | | | 91.5 |

Figure 23:
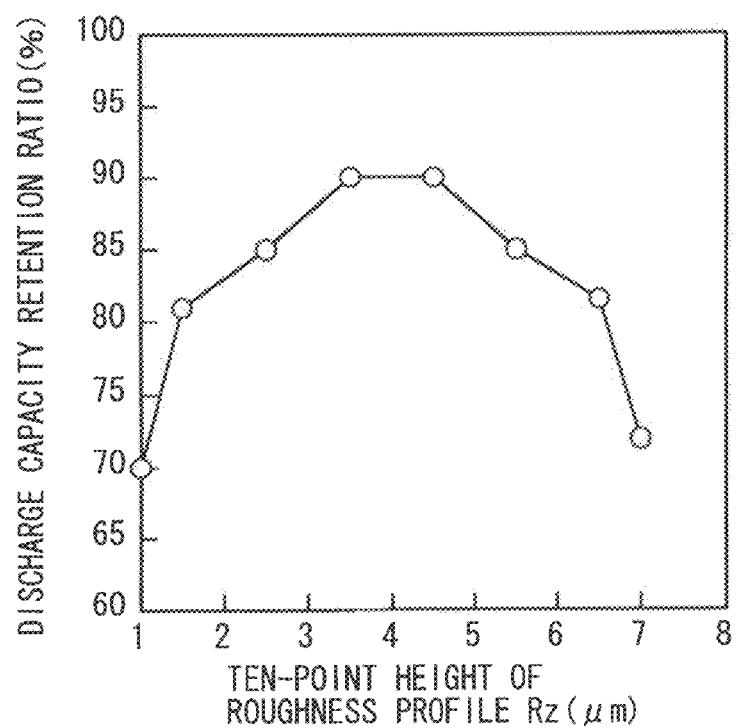
FIG. 23 is a diagram showing a correlation between a ten-point height of roughness profile and a discharge capacity retention ratio.

As shown in Table 14, in Examples 14-1 to 14-3 in which the anode active material included the first and second oxy- Table 15 and FIG. 23 were obtained. In Table 15, the result of Example 2-8 is also shown.

TABLE 15

Anode active material: silicon (electron beam evaporation)

| | ANODE ACTIVE MATERIAL LAYER NUMBER (LAYER) | OXIDE-CONTAINING FILM KIND | OXIDE-CONTAINING FILM FORMING METHOD | UNIT VOLUMETRIC CAPACITY (cm$^3$/g) | PEAK DIAMTER (nm) | ANODE CURRENT COLLECTOR TEN-POINT HEIGHT OF ROUGHNESS PROFILE Rz | DISCHARGE CAPACITY RETENTION RATIO (%) |
|---|---|---|---|---|---|---|---|
| EXAMPLE 15-1 | 6 | SiO$_2$ | LIQUID-PHASE DEPOSITION | 0.1 | 7000 | 1 | 70 |
| EXAMPLE 15-2 | | | | | | 1.5 | 81 |
| EXAMPLE 15-3 | | | | | | 2.5 | 85 |
| EXAMPLE 2-8 | | | | | | 3.5 | 90 |
| EXAMPLE 15-4 | | | | | | 4.5 | 90 |

TABLE 15-continued

Anode active material: silicon (electron beam evaporation)

| | ANODE ACTIVE MATERIAL LAYER | OXIDE-CONTAINING FILM | | UNIT VOLUMETRIC | PEAK | ANODE CURRENT COLLECTOR TEN-POINT | DISCHARGE CAPACITY |
|---|---|---|---|---|---|---|---|
| | NUMBER (LAYER) | KIND | FORMING METHOD | CAPACITY (cm³/g) | DIAMTER (nm) | HEIGHT OF ROUGHNESS PROFILE Rz | RETENTION RATIO (%) |
| EXAMPLE 15-5 | | | | | | 5.5 | 85 |
| EXAMPLE 15-6 | | | | | | 6.5 | 81.5 |
| EXAMPLE 15-7 | | | | | | 7 | 72 |

As shown in Table 15, in Examples 15-1 to 15-7 in which the ten-point height of roughness profile Rz was different, the discharge capacity retention ratio was increased to 70% or over. In this case, there was a tendency that as the ten-point height of roughness profile Rz increased, the discharge capacity retention ratio was increased, then decreased, and when the ten-point height of roughness profile Rz was 1.5 μm or over or 6.5 μm or less, the discharge capacity retention ratio was largely increased to 80% or over. Therefore, it was confirmed that in the secondary battery according to the embodiment of the invention, even in the case where the ten-point height of roughness profile Rz of the surface of the anode current collector 54A was changed, the cycle characteristics were improved, and when the ten-point height of roughness profile Rz was within a range from 1.5 μm to 6.5 μm both inclusive, the cycle characteristics were further improved.

Example 16-1

A secondary battery was formed by the same steps as those in Example 2-8, except that the anode active material (with a thickness of 7.5 μm) was formed by an RF magnetron sputtering method. At that time, silicon with a purity of 99.99% was used as a target, and the deposition rate was 0.5 nm/s.

Example 16-2

A secondary battery was formed by the same steps as those in Example 2-8, except that the anode active material (with a thickness of 7.5 μm) was formed by a CVD method. At that time, silane ($SiH_4$) and argon (Ar) were used as a material and an excitation gas, respectively, and the deposition rate and the substrate temperature were 1.5 nm/s and 200° C., respectively.

Comparative Examples 16-1 and 16-2

Secondary batteries were formed by the same steps as those in Comparative Examples 2-1 and 2-4, except that as in the case of Example 16-1, the anode active material was formed by an RF sputtering method.

Comparative Examples 16-3 and 16-4

Secondary batteries were formed by the same steps as those in Comparative Examples 2-1 and 2-4, except that as in the case of Example 16-2, the anode active material was formed by a CVD method.

When the cycle characteristics of the secondary batteries of Examples 16-1 and 16-2 and Comparative Examples 16-1 to 16-4 were determined, results shown in Table 16 were obtained. In Table 16, the results of Example 2-8 and Comparative Examples 2-1 and 2-4 are also shown.

TABLE 16

Anode active material: silicon
Ten-point height of roughness profile Rz = 3.5 μm

| | ANODE ACTIVE MATERIAL LAYER | | OXIDE-CONTAINING FILM | | UNIT VOLUMETRIC | PEAK | DISCHARGE CAPACITY |
|---|---|---|---|---|---|---|---|
| | NUMBER (LAYER) | FORMING METHOD | KIND | FORMING METHOD | CAPACITY (cm³/g) | DIAMTER (nm) | RETENTION RATIO (%) |
| EXAMPLE 2-8 | 6 | ELECTRON BEAM EVAPORATION | $SiO_2$ | LIQUID-PHASE DEPOSITION | 0.1 | 7000 | 90 |
| EXAMPLE 16-1 | | SPUTTERING | | | | | 87 |
| EXAMPLE 16-2 | | CVD | | | | | 86 |
| COMPARATIVE EXAMPLE 2-1 | 6 | ELECTRON BEAM EVAPORATION | $SiO_2$ | LIQUID-PHASE DEPOSITION | 0.1 | 50 | 55 |
| COMPARATIVE EXAMPLE 2-4 | | | | | | 20000 | 38 |
| COMPARATIVE EXAMPLE 16-1 | 6 | SPUTTERING | $SiO_2$ | LIQUID-PHASE DEPOSITION | 0.1 | 50 | 49 |
| COMPARATIVE EXAMPLE 16-2 | | | | | | 20000 | 58 |

TABLE 16-continued

| | Anode active material: silicon<br>Ten-point height of roughness profile Rz = 3.5 μm | | | | | | |
|---|---|---|---|---|---|---|---|
| | ANODE ACTIVE MATERIAL | | OXIDE-CONTAINING FILM | | UNIT VOLUMETRIC CAPACITY ($cm^3$/g) | PEAK DIAMTER (nm) | DISCHARGE CAPACITY RETENTION RATIO (%) |
| | LAYER NUMBER (LAYER) | FORMING METHOD | KIND | FORMING METHOD | | | |
| COMPARATIVE EXAMPLE 16-3 | 6 | CVD | $SiO_2$ | LIQUID-PHASE DEPOSITION | 0.1 | 50 | 50 |
| COMPARATIVE EXAMPLE 16-4 | | | | | | 20000 | 55 |

As shown in Table 16, in the case where the sputtering method or the like was used as the method of forming the anode active material, in Examples 16-1 and 16-2 in which the unit volumetric capacity was 0.3 $cm^3$/g or less, and the peak diameter was within a range from 200 nm to 15000 nm both inclusive, compared to Comparative Examples 16-1 to 16-4 in which the volumetric capacity was within the range, but the peak diameter was out of the range, the discharge capacity retention ratio was increased to 70% or over. In this case, it was obvious from a comparison among Examples 2-8, 16-1 and 16-2 in which only the method of forming the anode active material was different that in the case where the electron beam evaporation method was used, the discharge capacity retention ratio tended to be higher. Therefore, it was confirmed that in the secondary battery according to the embodiment of the invention, even in the case where the method of forming the anode active material was changed, the cycle characteristics were improved, and when the evaporation method was used, the cycle characteristics were further improved.

Example 17-1

A secondary battery was formed by the same steps as those in Example 2-8, except that instead of EC, as the solvent, 4-fluoro-1,3-dioxolane-2-one (FEC) as a fluorinated carbonate (monofluoroethylene carbonate) was used.

Example 17-2

A secondary battery was formed by the same steps as those in Example 2-8, except that as the solvent, 4,5-difluoro-1,3-dioxolane-2-one (DFEC) as a fluorinated carbonate (difluoroethylene carbonate) was added, and the composition (EC:DFEC:DEC) of the solvent had a weight ratio of 25:5:70.

Examples 17-3 and 17-4

Secondary batteries were formed by the same steps as those in Example 17-1, except that as the solvent, vinylene carbonate (VC: Example 17-3) or vinyl ethylene carbonate (VEC: Example 17-4) as a cyclic carbonate including an unsaturated bond was added to the electrolytic solution. At that time, the content of VC or VEC in the electrolytic solution was 10 wt %.

Example 17-5

A secondary battery was formed by the same steps as those in Example 17-1, except that as the solvent, 1,3-propane sultone (PRS) as a sultone was added to the electrolytic solution. At that time, the concentration of PRS in the electrolytic solution was 1 wt %.

Example 17-6

A secondary battery was formed by the same steps as those in Example 17-1, except that as an electrolyte salt, lithium tetrafluoroborate ($LiBF_4$) was added to the electrolytic solution. At that time, the concentration of $LiBF_4$ in the electrolytic solution was 0.1 mol/kg.

Examples 17-7 and 17-8

Secondary batteries were formed by the same steps as those in Example 17-1, except that as a solvent, sulfobenzoic anhydride (SBAH: Example 17-7) or sulfopropionic anhydride (SPAH: Example 17-8) as an acid anhydride was added to the electrolytic solution. At that time, the concentration of SBAH or SPAH in the electrolytic solution was 1 wt %.

When the cycle characteristics of the secondary batteries of Examples 17-1 to 17-8 were determined, results shown in Table 17 were obtained. In Table 17, the results of Example 2-8 is also shown.

At that time, in addition to the cycle characteristics, the swelling characteristics of the secondary batteries of Examples 2-8 and 17-5 were also determined. To determine the swelling characteristics, the thicknesses of the secondary batteries before charge were measured in an atmosphere at 23° C., and after the secondary batteries were charged in the same atmosphere, and the thicknesses of the secondary batteries after charge were measured, the swelling rate (%)=[(thickness after charge-thickness before charge)/thickness before charge]×100 was determined by calculation. At that time, charge conditions were the same as those in the case where the cycle characteristics were determined.

TABLE 17

Anode active material: silicon (electron beam evaporation)
Ten-point height of roughness profile Rz = 3.5 μm

|  | ANODE | | | | | | | | | DISCHARGE CAPACITY RETENTION RATION (%) | SWELLING RATE (%) |
|---|---|---|---|---|---|---|---|---|---|---|---|
|  | ANODE ACTIVE MATEIRAL LAYER NUMBER (LAYER) | OXIDE-CONTAINING FILM | | UNIT VOLUMETRIC CAPACITY (cm³/g) | PEAK DIAMETER (nm) | ELECTROLYTIC SOLUTION | | | | | |
|  |  | KIND | FORMING METHOD |  |  | SOLVENT (wt %) | | | | | |
|  |  |  |  |  |  | EC | FEC | DFEC | DEC | OTHERS | | |
| EXAMLPE 2-8 | 6 | SiO₂ | LIQUID-PHASE DEPOSITION | 0.1 | 7000 | 50 | — | — | 50 | — | 90 | 2.99 |
| EXAMPLE 17-1 | | | | | | — | 50 | — | 50 | | 92 | — |
| EXAMPLE 17-2 | | | | | | 25 | — | 5 | 70 | | 93 | — |
| EXAMPLE 17-3 | | | | | | — | 50 | — | 50 | VC | 91.6 | — |
| EXAMPLE 17-4 | | | | | | | | | | VEC | 91.8 | — |
| EXAMPLE 17-5 | | | | | | | | | | PRS | 90.1 | 0.35 |
| EXAMPLE 17-6 | | | | | | | | | | LiBF₄ | 90.5 | — |
| EXAMPLE 17-7 | | | | | | | | | | SBAH | 91.1 | — |
| EXAMPLE 17-8 | | | | | | | | | | SPAH | 91.2 | — |

As shown in Table 17, in Examples 17-1 to 17-8 in which the solvent included FEC or the like, as in the case of Example 2-8 in which the solvent did not include FEC or the like, the discharge capacity retention ratio was increased to 70% or over. In this case, there was a tendency that in the case where the solvent included FEC or the like, the discharge capacity retention ratio was higher, and in the case where the solvent included PRS, the swelling rate was reduced. In particular, in the case where a fluorinated carbonate was used, the discharge capacity retention ratio in the case where DFEC was used was higher than that in the case where FEC was used. Therefore, it was confirmed that in the secondary battery according to the embodiment of the invention, even in the case where the composition of the solvent or the kind of the electrolyte salt was changed, the cycle characteristics were improved. In this case, it was confirmed that when a cyclic carbonate including an unsaturated bond, a fluorinated carbonate, a sultone, or an electrolyte salt including boron and fluorine was included, and difluoroethylene carbonate, rather than monofluoroethylene carbonate, was included, the cycle characteristics were further improved, and when the solvent included a sultone, the swelling characteristics were improved.

Example 18-1

A secondary battery was formed by the same steps as those in Example 2-8, except that instead of the laminate film type secondary battery, a prismatic secondary battery shown in FIGS. 8 and 9 was formed by the following steps.

At first, after the cathode 21 and the anode 22 were formed, the cathode lead 24 made of aluminum and the anode lead 25 made of nickel were welded to the cathode current collector 21A and the anode current collector 22A, respectively. Next, the cathode 21 and the anode 22 were laminated with the separator 23 in between, and were spirally wound in a longitudinal direction, and then molded into a flat shape, thereby the battery element 20 was formed. Then, after the battery element 20 was contained in the battery can 11 made of aluminum, the insulating plate 12 was arranged on the battery element 20. Next, after the cathode lead 24 and the anode lead 25 were welded to the cathode pin 15 and the battery can 11, respectively, the battery cover 13 was fixed in an open end of the battery can 11 by laser welding. Finally, the electrolytic solution was injected into the battery can 11 through the injection hole 19, and the injection hole 19 was filled with the sealing member 19A, thereby a prismatic battery was formed.

Example 18-2

A secondary battery was formed by the same steps as those in Example 18-1, except that the battery can 11 made of iron was used.

When the cycle characteristics of the secondary batteries of Examples 18-1 and 18-2 were determined, results shown in Table 18 were obtained. In Table 18, the result of Example 2-8 is also shown.

TABLE 18

Anode active material: silicon (electron beam evaporation)
Ten-point height of roughness profile Rz = 3.5 μm

|  | BATTERY CONFIGURATION | ANODE ACTIVE MATERIAL LAYER NUMBER (LAYER) | OXIDE-CONTAINING FILM | | UNIT VOLUMETRIC CAPACITY (cm³/g) | PEAK DIAMTER (nm) | DISCHARGE CAPACITY RETENTION RATIO (%) |
|---|---|---|---|---|---|---|---|
|  |  |  | KIND | FORMING METHOD |  |  |  |
| EXAMPLE 2-8 | LAMINATE FILM | 6 | SiO₂ | LIQUID-PHASE DEPOSITION | 0.1 | 7000 | 90 |
| EXAMPLE 18-1 | PRISMATIC (ALUMINUM) | | | | | | 91 |

TABLE 18-continued

Anode active material: silicon (electron beam evaporation)
Ten-point height of roughness profile Rz = 3.5 µm

| | BATTERY CONFIGURATION | ANODE ACTIVE MATERIAL LAYER NUMBER (LAYER) | OXIDE-CONTAINING FILM KIND | OXIDE-CONTAINING FILM FORMING METHOD | UNIT VOLUMETRIC CAPACITY ($cm^3/g$) | PEAK DIAMTER (nm) | DISCHARGE CAPACITY RETENTION RATIO (%) |
|---|---|---|---|---|---|---|---|
| EXAMPLE 18-2 | PRISMATIC (IRON) | | | | | | 93 |

As shown in Table 18, in Examples 18-1 and 18-2 in which the battery configuration was the prismatic type, as in the case of Example 2-8 in which the battery configuration was the laminate film type, the discharge capacity retention ratio was increased to 70% or over. In this case, there was a tendency that in the case where the package member made of a metal was used, the discharge capacity retention ratio was higher, and in the case where the package member was made of iron, the discharge capacity retention ratio was further increased. Therefore, it was confirmed in the secondary battery according to the embodiment of the invention, even in the case where the battery configuration was changed, the cycle characteristics were improved. In this case, it was confirmed that when the package member made of a metal was used, the cycle characteristics were further improved, and when the package member was made of iron, the cycle characteristics were further improved.

Although descriptions are not given here referring to a specific example, in a prismatic secondary battery in which the package member was made of a metal material, the cycle characteristics and the swelling characteristics were further improved, compared to the laminate film type secondary battery, so it was obvious that in a cylindrical secondary battery in which the package member is made of a metal material, the same result was obtained.

As described above, it was obvious from the results shown in Tables 1 to 18 and FIGS. 14 to 23 that in the case where the anode active material including silicon included a plurality of pores, after charge and discharge, the volumetric capacity of a pore group with a diameter ranging from 3 nm to 200 nm both inclusive per unit weight of silicon was 0.3 $cm^3/g$ or less, and the rate of change in the amount of mercury intruded into the plurality of pores which was measured by mercury porosimetry was distributed so as to have a peak in a diameter range from 200 nm to 15000 nm both inclusive, thereby independent of the number of layers of the anode active material, the composition of the anode active material, the composition of the electrolyte solution, the battery configuration or the like, the cycle characteristics were improved.

Although the present invention is described referring to the embodiment and the examples, the invention is not limited to the embodiment and the examples, and may be variously modified. The application of the anode of the invention is not limited to batteries, and the anode may be applied to any other electrochemical devices in addition to the batteries. As the other application, for example, a capacitor or the like is cited.

Moreover, in the above-described embodiment and the above-described examples, as the imbedding material for pores, the oxide-containing film, the metal material not alloyed with an electrode reactant, or a fluorine resin is included; however, the imbedding material is not limited to them, and any other imbedding material may be included. It is preferable that the imbedding material does not have a specific influence on the performance of the anode or the battery. The above-described SEI film may be considered as a kind of the imbedding material.

Further, in the above-described embodiment and the above-descried examples, the case where the electrolytic solution or the gel electrolyte in which the polymer compound holds the electrolytic solution is used as an electrolyte is described; however, any other kind of electrolyte may be used. Examples of the electrolyte include a mixture of an ion-conducting inorganic compound such as ion-conducting ceramic, ion-conducting glass or ionic crystal and an electrolytic solution, a mixture of another inorganic compound and an electrolytic solution, a mixture of the inorganic compound and a gel electrolyte, and the like.

In the above-described embodiment and the above-described examples, as the kind of the secondary battery, the lithium-ion secondary battery in which the capacity of the anode is represented based on the insertion and extraction of lithium is described; however, the invention is not limited to the lithium-ion secondary battery. The secondary battery of the invention is applicable to a secondary battery in which the charge capacity of an anode active material capable of inserting and extracting lithium is smaller than the charge capacity of a cathode active material, thereby the capacity of the anode includes a capacity by insertion and extraction of lithium and a capacity by precipitation and dissolution of lithium, and is represented by the sum of them in the same manner.

In the above-described embodiment and the above-described examples, the case where the battery has a prismatic type, a cylindrical type or a laminate film type, and the case where the battery element has a spirally wound configuration are described as examples; however, the secondary battery of the invention is applicable to the case where a secondary battery has any other shape such as a coin type or a button type or the case where the battery element has any other configuration such as a laminate configuration in the same manner. In addition, the invention is applicable to not only the secondary batteries but also other kinds of batteries such as primary batteries.

In the above-described embodiment and the above-described examples, the case where lithium is used as an electrode reactant is described; however, any other Group 1A element such as sodium or potassium, a Group 2A element such as magnesium or calcium, or any other light metal such as aluminum may be used. Also in this case, as the anode active material, the material described in the above-described embodiment may be used.

In the above-described embodiment and the above-described examples, an appropriate range, which is derived from the results of the examples, of the volumetric capacity of a pore group with a diameter ranging from 3 nm to 200 nm both inclusive per unit weight of silicon in the anode or the battery of the invention is described; however, the description does not exclude the possibility that the volumetric capacity is out of the above-described range. More specifically, the above-described appropriate range is specifically a preferable range to obtain the effects of the invention, and as long as the effects of the invention are obtained, the volumetric capacity may be deviated from the above-described range to some extent. The same holds for the diameter at which the rate of change in the amount of mercury intruded into a plurality of pores which is measured by mercury porosimetry has a peak, the ten-point height of roughness profile Rz of the surface of the anode current collector, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An anode comprising:
   an anode active material layer including an anode active material on an anode current collector, the anode active material layer including silicon (Si) and having a plurality of pores in a diameter range of 3 nm to 15000 nm, wherein
   after at least one electrode reaction the active anode material has a volumetric capacity, of a pore group of the plurality of pores with a diameter ranging from 3 nm to 200 nm both inclusive, of 0.3 cm$^3$/g or less, as calculated per unit weight of silicon and as measured by mercury porosimetry, and
   a rate of change in an amount of mercury intruded into the plurality of pores is distributed amongst the diameter range of 3 nm to 15000 nm so as to have a peak in a diameter range from 200 nm to 15000 nm both inclusive, the rate of change in the amount of mercury intruded being measured by mercury porosimetry.

2. The anode according to claim 1, wherein the volumetric capacity of the pore group per unit weight of silicon is 0.1 cm$^3$/g or less, and the rate of change in the amount of mercury intruded has a peak in a diameter range from 700 nm to 12000 nm both inclusive.

3. The anode according to claim 1, wherein the volumetric capacity of the pore group per unit weight of silicon is 0 cm$^3$/g, and the rate of change in the amount of mercury intruded has a peak in a diameter range from 1000 nm to 10000 nm both inclusive.

4. The anode according to claim 1, wherein the anode active material layer includes an oxide-containing film in the pores.

5. The anode according to claim 4, wherein the oxide-containing film includes at least one kind of oxide selected from the group consisting of an oxide of silicon, an oxide of germanium (Ge) and an oxide of tin (Sn).

6. The anode according to claim 4, wherein the oxide-containing film is formed by a liquid-phase deposition method, a sol-gel method, a coating method or an immersion method.

7. The anode according to claim 1, wherein the anode active material layer includes a metal material not alloyed with an electrode reactant in the pores.

8. The anode according to claim 7, wherein the metal material includes at least one kind selected from the group consisting of iron (Fe), cobalt (Co), nickel (Ni), zinc (Zn) and copper (Cu).

9. The anode according to claim 7, wherein the metal material is formed by a plating method.

10. The anode according to claim 1, wherein the anode active material layer includes a fluorine resin in the pores.

11. The anode according to claim 10, wherein the fluorine resin includes an ether bond (—O—).

12. The anode according to claim 10, wherein the fluorine resin is perfluoropolyether.

13. The anode according to claim 10, wherein the fluorine resin is formed by an immersion method.

14. The anode according to claim 1, wherein the anode active material is in the form of a plurality of particles.

15. The anode according to claim 14, wherein the anode active material has a multilayer configuration in its particles.

16. The anode according to claim 1, wherein the anode active material is formed by a vapor-phase method.

17. The anode according to claim 1, wherein the anode active material includes at least one kind of metal element selected from the group consisting of iron, cobalt, nickel, chromium (Cr), titanium (Ti) and molybdenum (Mo).

18. The anode according to claim 1, wherein the anode active material includes an oxygen-containing region including oxygen in its thickness direction, and the oxygen content in the oxygen-containing region is higher than the oxygen content in a region other than the oxygen-containing region.

19. The anode according to claim 1, wherein the ten-point height of roughness profile Rz of the surface of the anode current collector is within a range from 1.5 µm to 6.5 µm both inclusive.

20. A battery comprising a cathode, an anode and an electrolytic solution, wherein the anode includes:
   an anode active material layer including an anode active material on an anode current collector, wherein
   the anode active material layer includes silicon and has a plurality of pores in a diameter range of 3 nm to 15000 nm, and after charge and discharge, a volumetric capacity, of a pore group of the plurality of pores with a diameter ranging from 3 nm to 200 nm both inclusive, is 0.3 cm$^3$/g or less, as calculated per unit weight of silicon and as measured by mercury porosimetry,
   a rate of change in an amount of mercury intruded into the plurality of pores is distributed amongst the diameter range of 3 nm to 15000 nm so as to have a peak in a diameter range from 200 nm to 15000 nm both inclusive, the rate of change in the amount of mercury intruded being measured by mercury porosimetry.

21. The battery according to claim 20, wherein the volumetric capacity of the pore group per unit weight of silicon is 0.1 cm$^3$/g or less, and the rate of change in the amount of mercury intruded has a peak in a diameter range from 700 nm to 12000 nm both inclusive.

22. The battery according to claim 20, wherein the volumetric capacity of the pore group per unit weight of silicon is 0 cm$^3$/g, and the rate of change in the amount of mercury intruded has a peak in a diameter range from 1000 nm to 10000 nm both inclusive.

23. The battery according to claim 20, wherein the anode active material layer includes an oxide-containing film in the pores.

24. The battery according to claim 23, wherein the oxide-containing film includes at least one kind of oxide selected from the group consisting of an oxide of silicon, an oxide of germanium and an oxide of tin.

25. The battery according to claim 23, wherein the oxide-containing film is formed by a liquid-phase deposition method, a sol-gel method, a coating method or an immersion method.

26. The battery according to claim 20, wherein the anode active material layer includes a metal material not alloyed with an electrode reactant in the pores.

27. The battery according to claim 26, wherein the metal material includes at least one kind selected from the group consisting of iron, cobalt, nickel, zinc and copper.

28. The battery according to claim 26, wherein the metal material is formed by a plating method.

29. The battery according to claim 20, wherein the anode active material layer includes a fluorine resin in the pores.

30. The battery according to claim 29, wherein the fluorine resin includes an ether bond.

31. The battery according to claim 29, wherein the fluorine resin is perfluoropolyether.

32. The battery according to claim 29, wherein the fluorine resin is formed by an immersion method.

33. The battery according to claim 20, wherein the anode active material is in the form of a plurality of particles.

34. The battery according to claim 33, wherein the anode active material has a multilayer configuration in its particles.

35. The battery according to claim 20, wherein the anode active material is formed by a vapor-phase method.

36. The battery according to claim 20, wherein the anode active material includes at least one kind of metal element selected from the group consisting of iron, cobalt, nickel, chromium, titanium and molybdenum.

37. The battery according to claim 20, wherein the anode active material includes an oxygen-containing region including oxygen in its thickness direction, and the oxygen content in the oxygen-containing region is higher than the oxygen content in a region other than the oxygen-containing region.

38. The battery according to claim 20, wherein the ten-point height of roughness profile Rz of the surface of the anode current collector is within a range from 1.5 μm to 6.5 μm both inclusive.

39. The battery according to claim 20, wherein the electrolytic solution includes a solvent including a sultone.

40. The battery according to claim 39, wherein the sultone is 1,3-propene sultone.

41. The battery according to claim 20, wherein the electrolytic solution includes a solvent including a cyclic carbonate including an unsaturated bond.

42. The battery according to claim 41, wherein the cyclic carbonate including an unsaturated bond is vinylene carbonate or vinyl ethylene carbonate.

43. The battery according to claim 20, wherein the electrolytic solution includes a solvent including a fluorinated carbonate.

44. The battery according to claim 43, wherein the fluorinated carbonate is difluoroethylene carbonate.

45. The battery according to claim 20, wherein the electrolytic solution includes a solvent including an acid anhydride.

46. The battery according to claim 45, wherein the acid anhydride is sulfobenzoic anhydride or sulfopropionic anhydride.

47. The battery according to claim 20, wherein the electrolytic solution includes an electrode salt including boron (B) and fluorine (F).

48. The battery according to claim 47, wherein the electrolyte salt is lithium tetrafluoroborate ($LiBF_4$).

49. The battery according to claim 20, wherein the cathode, the anode and the electrolytic solution are contained in a cylindrical or prismatic package member.

50. The battery according to claim 49, wherein the package member includes iron or an iron alloy.

51. The battery according to claim 20, wherein the pores of the anode active material layer are located between particles of the anode active material.

52. The anode according to claim 1, wherein the pores of the anode active material layer are located between particles of the anode active material.

\* \* \* \* \*